(12) United States Patent
Corson et al.

(10) Patent No.: US 8,427,426 B2
(45) Date of Patent: *Apr. 23, 2013

(54) REMOTE INPUT DEVICE

(75) Inventors: Gregory A. Corson, San Mateo, CA (US); Gary Michael Zalewski, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 743 days.

This patent is subject to a terminal disclaimer.

(21) Appl. No.: 12/513,359

(22) PCT Filed: May 26, 2006

(86) PCT No.: PCT/US2006/020658
§ 371 (c)(1), (2), (4) Date: May 1, 2009

(87) PCT Pub. No.: WO2006/128093
PCT Pub. Date: Nov. 30, 2006

(65) Prior Publication Data
US 2010/0214214 A1    Aug. 26, 2010

Related U.S. Application Data

(63) Continuation-in-part of application No. 11/139,254, filed on May 27, 2005, now Pat. No. 7,548,230.

(51) Int. Cl.
*G06F 3/033* (2006.01)
*G09G 5/08* (2006.01)

(52) U.S. Cl.
USPC .......................................... 345/157; 356/614

(58) Field of Classification Search ........... 345/157–158
See application file for complete search history.

(56) References Cited

U.S. PATENT DOCUMENTS 4,787,051 A    11/1988    Olson
4,843,568 A    6/1989    Krueger
(Continued)

FOREIGN PATENT DOCUMENTS
WO    WO 2008/056180 A2    5/2008

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262 270.

(Continued)

*Primary Examiner* — Kevin M Nguyen
*Assistant Examiner* — Kenneth B Lee, Jr.
(74) *Attorney, Agent, or Firm* — Kilpatrick Townsend and Stockton LLP

(57) ABSTRACT

An input device providing users with a pointing capability includes a sender portion and a receiver portion. The sender portion is adapted to be manipulated by a user to specify a target point within a target area. The sender portion projects a light beam including a pattern onto the target area. A receiver portion includes one or more sensor units located in or near the target area. At least some of the sensor units receive a portion of the light beam regardless of the location of the target point within the target area. A processing unit in the receiver portion analyzes the portions of the light beam received by one or more sensor units to determine an attribute of the target point. The attribute can be the location or relative motion of the target point. The receiver portion may be integrated with a display device.

28 Claims, 13 Drawing Sheets

U.S. PATENT DOCUMENTS

| | | | |
|---|---|---|---|
| 5,128,671 | A | 7/1992 | Thomas, Jr. |
| 5,528,265 | A | 6/1996 | Harrison |
| 5,554,980 | A | 9/1996 | Hashimoto et al. |
| 5,644,126 | A | 7/1997 | Ogawa |
| 6,157,368 | A | 12/2000 | Faeger |
| 6,184,863 | B1 | 2/2001 | Sibert et al. |
| 6,346,933 | B1 * | 2/2002 | Lin ............... 345/157 |
| 6,375,572 | B1 | 4/2002 | Masuyama |
| 6,377,242 | B1 | 4/2002 | Sweed |
| 6,424,410 | B1 | 7/2002 | Pelosi |
| 6,501,515 | B1 | 12/2002 | Iwamura |
| 6,654,008 | B2 | 11/2003 | Ikeda et al. |
| 7,346,837 | B2 * | 3/2008 | Shimizu ............... 714/799 |
| 7,359,564 | B2 | 4/2008 | Keam et al. |
| 7,405,726 | B2 | 7/2008 | Pelosi |
| 7,495,655 | B2 | 2/2009 | Bollhoefer |
| 7,499,027 | B2 | 3/2009 | Brigham, II et al. |
| 7,548,230 | B2 * | 6/2009 | Corson ............... 345/157 |
| 2001/0045940 | A1 | 11/2001 | Hansen |
| 2002/0080195 | A1 | 6/2002 | Carlson et al. |
| 2002/0085097 | A1 | 7/2002 | Colmenarez et al. |
| 2003/0107748 | A1 * | 6/2003 | Lee ............... 356/614 |
| 2003/0136844 | A1 | 7/2003 | Dvorkis |
| 2004/0070564 | A1 | 4/2004 | Dawson et al. |
| 2004/0075646 | A1 | 4/2004 | Waters |
| 2004/0212589 | A1 | 10/2004 | Hall et al. |
| 2004/0213419 | A1 | 10/2004 | Varma et al. |
| 2007/0109267 | A1 | 5/2007 | Guo et al. |
| 2008/0094353 | A1 | 4/2008 | Marks |

OTHER PUBLICATIONS

DeWitt, Thomas and Edelstein, Phil, "Pantomation: A System for Position Tracking," Proceedings of the 2nd Symposium on Small Computers in the Arts, Oct. 1982, pp. 61-69.

International Search Report mailed on Oct. 12, 2006, for International Application No. PCT/US06/20658 filed on May 26, 2006, 1 page.

\* cited by examiner

REMOTE INPUT DEVICE

CROSS-REFERENCE TO RELATED APPLICATIONS

This application is the national stage of international application no. PCT/US2006/020658, filed May 26, 2006, which is a continuation in part of prior U.S. application Ser. No. 11/139,254 to Gregory A. Corson, entitled "REMOTE INPUT DEVICE" (issued Jun. 16, 2009 as U.S. Pat. No. 7,548,230), filed May 27, 2005.

FIELD OF THE INVENTION

Embodiments of the invention are related to the field of input devices suitable for operating display devices and other electronic devices.

BACKGROUND OF THE INVENTION

Many consumer electronics devices, such as televisions, video playback and recording devices, and cable boxes, have numerous complicated and esoteric functions that need to be controlled by a user from a distance. Some manufacturers provide users with complicated remote controls that include dedicated buttons for all of the device's functions. However, complicated remote controls are expensive and discourage casual users from operating the equipment.

As an alternative, the user interfaces for many consumer electronic devices employ on-screen displays to enable users to control many device functions. The on-screen display provides users with a graphical user interface. One type of graphical user interface is a menu-based user interface. Menu-based interfaces group functions together under one or more nested menus. User can move between menus using a joystick or directional pad included in the remote control. However, because menu-based interfaces often bury functions under one or more menus or sub-menus, they are often difficult to use. Additionally, users must often input numerous button presses to navigate to and select the desired menu item.

Pointer-based graphical user interfaces are widely employed to operate computers. Typically, users manipulate an on-screen pointer using a mouse to interact with the graphical user interface. Pointer-based graphical user interfaces allow users to view and manipulate icons for a large number of functions with relative ease. A mouse typically requires a flat, smooth surface to operate correctly. In office environments, where users are typically seated at a desk, a mouse is an effective input device.

However, in many applications, the user does not have access to a flat surface. In these applications, a mouse is difficult and inconvenient to use. In an example, a user standing and giving a presentation must often return to a podium, table, or other flat surface to manipulate a mouse. In another example, in home entertainment environment, a user is often seated or lying down on a sofa or reclining chair. In this environment, the user would often have to change position to operate a mouse. As a result of this disruption, mice are not widely used in casual environments where the user is not likely to be seated in front of a flat surface.

To implement a pointer-based user interface in consumer electronics devices, some remote controls for consumer electronics devices include a digital or analog joystick to control an on-screen pointer of a pointer-based on-screen display. Unfortunately, users often find controlling a pointer using a joystick to be difficult, non-intuitive, and frustrating.

Other types of input devices have been developed to provide users with more intuitive ways of directing an on-screen pointer. One of these types of devices is the light gun or light pen. Light guns and light pens typically determine a pointer location by measuring the timing of a raster-scan based display. As a result, these types of devices cannot operate from non-raster scanned displays, such as LCD, plasma, and non-CRT based projection displays. Another type of light gun projects a narrow infrared beam at a target point. A camera located behind the user detects beam and deduces the position of the target point. This type of light gun is complicated and expensive, requiring the installation of a camera on the opposite wall from the target display.

Another type of remote input device is the Gyromouse, made by Gyration Inc. The Gyromouse includes one or more solid-state gyroscopes adapted to sense movement. As the user manipulates this device, the gyroscopes detect the motion and send a signal, often via radio waves, to a receiver unit. The receiver unit then interprets this signal into a pointer movement. The disadvantages of this device are its complexity, cost, size, and power consumption. Moreover, this type of device is often only sensitive to large amounts of motion. Thus, users must move the device substantially to operate the pointer.

It is therefore desirable for input device to provide users with an intuitive pointing capability. It is further desirable that the input device be capable of operating in free space, rather than requiring a flat surface. It is also desirable for the input device to be inexpensive to manufacture, provide long battery life, and to work with a variety of different types of displays. It is additionally desirable for the input device to be easily integrated with a variety of devices, including consumer electronic devices such a televisions, DVD players and recorders, digital or personal video recorders, cable and satellite set-top boxes, and video game consoles.

BRIEF SUMMARY OF THE INVENTION

An embodiment of the invention is an input device that provides users with a pointing capability. This embodiment includes a sender portion and a receiver portion. The sender portion is adapted to be manipulated by a user to specify a target point within a target area. The sender portion projects a light beam including a pattern on to the target area. A receiver portion includes one or more sensor units located in or near the target area. At least some of the sensor units receive a portion of the light beam regardless of the location of the target point within the target area. A processing unit in the receiver portion analyzes the portions of the light beam received by one or more sensor units to determine an attribute of the target point. The attribute can be the location or relative motion of the target point. The receiver portion may be integrated with a display device.

In an embodiment, a system for providing a positional input value to an electronic device includes a sender portion adapted to be manipulated by a user to specify a target point within a target area. The sender portion includes a light projecting system adapted to project a beam of light including a predefined spatially varying characteristic at the target area. The system also includes a receiver portion including at least one sensor unit. The sensor unit is adapted to measure at least one value of the spatially varying characteristic of the beam of light at the location of the sensor unit. The receiver portion includes logic adapted to determine a positional input value associated with the target point from the value of the spatially varying characteristic at the location of the sensor unit.

In a further embodiment, the light projecting system is adapted to disperse the beam of light such that at least a portion of the beam light is received by at least one sensor unit of the receiver portion regardless of the location of the target point within the target area.

In another embodiment, the predefined spatially varying characteristic of the beam of light is an intensity pattern. Additionally, the sensor unit is part of a plurality of sensor units. Each sensor unit is at a different location and is adapted to measure the value of the spatially varying characteristic of the beam of light at its respective location. The value of the spatially varying characteristic is an intensity of light received from the sender portion. The receiver portion includes logic adapted to determine the positional input value associated with the target point from intensity of the beam of light measured by the plurality of sensor unit locations. The positional input value can be an absolute or relative position of the target point.

In another embodiment, the predefined spatially varying characteristic of the beam of light is a pattern including a plurality of intensity transitions adapted to indicate motion of the target point. Example patterns include a plurality of concentric circles and a plurality of speckles. In a further embodiment, the sensor unit includes a plurality of sensors arranged to detect a direction of pattern motion along at least one axis. The receiver portion includes logic adapted to compare changes in intensity received by each sensor over time to determine a direction and magnitude of pattern motion. The positional input value can be a relative motion of the target point, as measured by the pattern motion.

BRIEF DESCRIPTION OF THE DRAWINGS

The invention will be described with reference to the drawings, in which.

In the drawings, the use of identical reference numbers indicates similar elements.

DETAILED DESCRIPTION OF THE INVENTION

Figure 1:
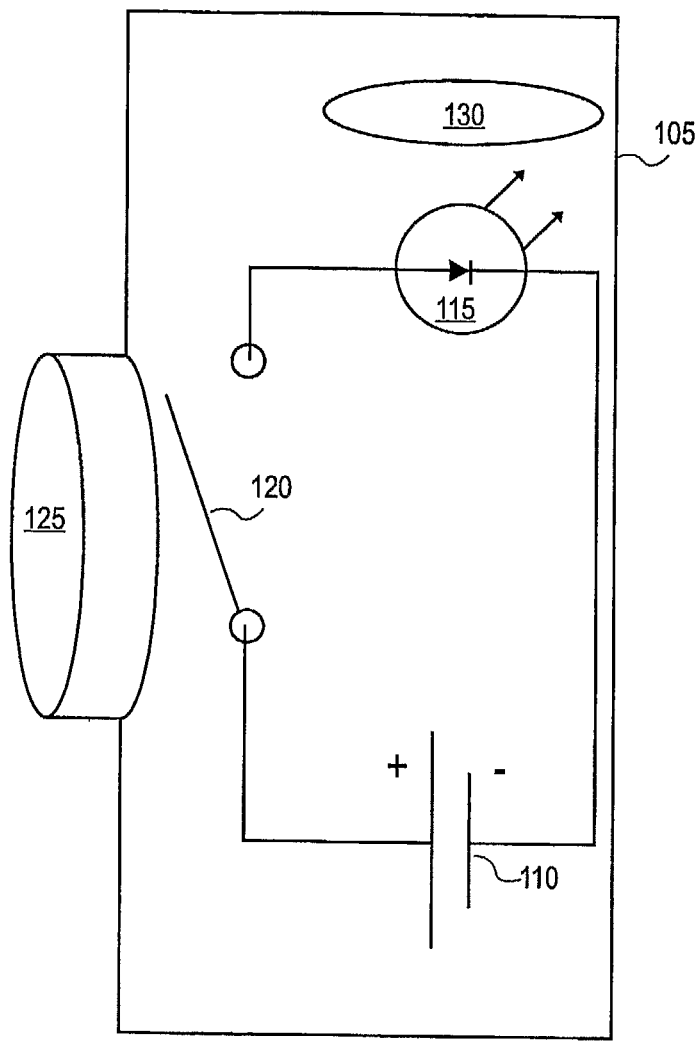
FIG. 1 illustrates a sender portion of an embodiment of the invention.

FIG. 1 illustrates a sender portion 100 of an embodiment of the invention. The sender portion 100 is adapted to be manipulated by a user. The user points the sender portion 100 at a target area to specify a target point. The position of the target point manipulates a pointer or other user interface element. In an embodiment, the target point is within the boundaries of a target area. An example target area is the screen of a display device, such as a television. In further embodiments, discussed below, the sender portion 100 allows the user to specify an absolute location for a pointer or user interface element and/or a relative movement of a pointer or user interface element from a previous location.

Sender portion 100 includes a housing 105, a battery or other power supply 110, and a light source 115. Light source 115 can emit visible or non-visible light, for example infrared light. Light source 115 can include a light bulb, light emitting diode (LED), or other type of light producing device known in the art. To reduce interference from other light sources or control devices, such as infrared remote controls, light source 115 may modulate its light output using any modulation or coding scheme known in the art. A switch or other control device 120 connects the light source 115 with the battery 110, thereby activating the light source 115. In an embodiment, the switch or control device 120 can be actuated by a button 125. In further embodiments, the switch or control device 120 can include a timer or motion sensor adapted to activate and/or deactivate the light source 115. For example, a user can activate the light source 115 by pressing the button 125. As an example, the light source 115 may then deactivate upon the release of the button 125, upon the expiration of a timer, upon the cessation of motion, or any combination of these events.

The output of light source 115 passes through optical system 130. In an embodiment, optical system 130 includes one or more lenses, filters, diffraction gratings, holographic optics, slides with patterns, and/or other optical elements. The optical system 130 may disperse and/or encodes patterns on the light emitted from the light source 115 such that a receiver portion, discussed below, can identify the target point and/or its relative motion. Example patterns introduced by the optical system 130 include a linear or non-linear intensity gradient, a set of concentric rings, a Gaussian distribution, a set of randomly or pseudo-randomly distributed dots or speckles or any other. As discussed above, because embodiments of the light source 115 can emit non-visible light, the pattern projected by the sender portion 100 may or may not be visible to the user.

In general, the pattern projected by the sender portion 100 should be dispersed wide enough so that at typical user distances from the target area, at least a portion of the pattern covers one or more sensors of the receiver portion, discussed below, for all possible target points within the target area. For example, if the target area is the screen of a television set and the typical user environment is a user's living room, then the sender portion 100 should disperse the pattern enough to cover one or more sensors of the receiver portion at distances from the target area typical for television viewing.

In an embodiment, the sender portion 100 can be a standalone system. In other embodiments, the sender portion 100 can be incorporated into other types of control devices, such as an infrared remote control. In further embodiments, the light source 115 or an auxiliary light source, such as a low-power laser, provides a visual indicator of the target point to the user, for example by projecting a focused beam of visible light on the target point.

Figure 2:
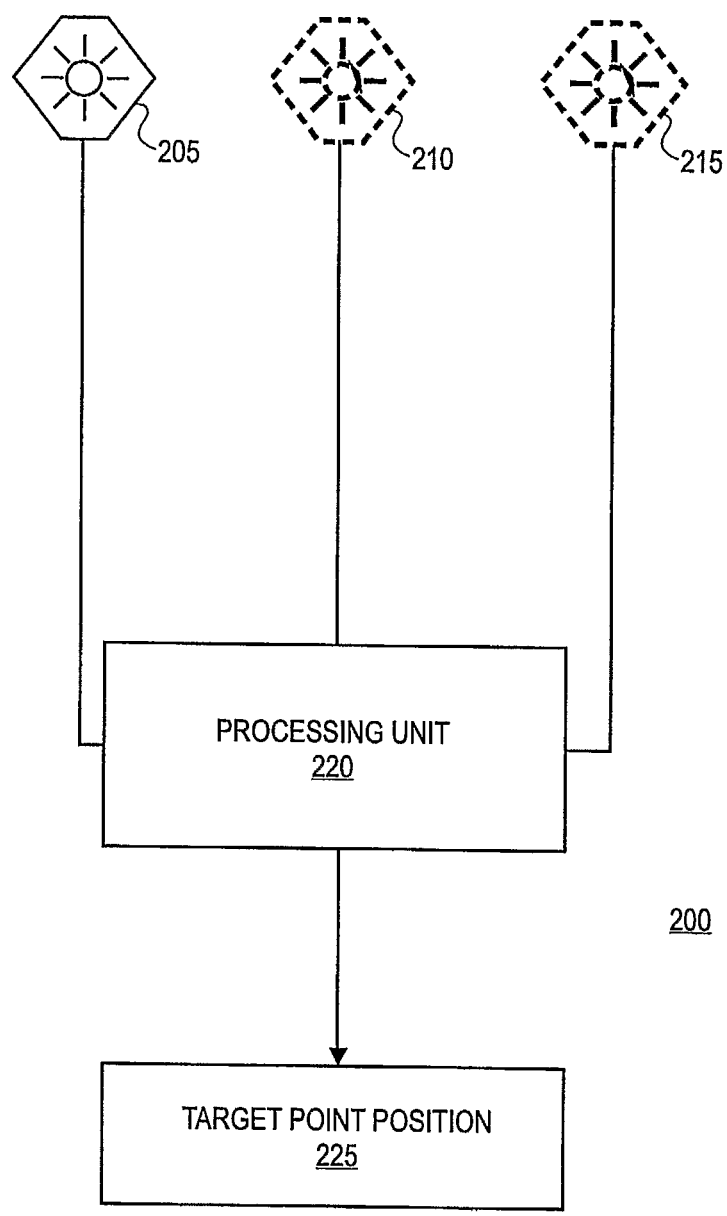
FIG. 2 illustrates a receiver portion of an embodiment of the invention.

FIG. 2 illustrates a receiver portion 200 of an embodiment of the invention. Receiver portion 200 includes sensor unit 205. Sensor unit 205 includes one or more sensors responsive to the light emitted from the light source 115 discussed above. In further embodiments, sensor unit 205 may include one or more filters, lenses, diffraction gratings, holographic optics, slides with patterns, and/or other optical elements adapted to help the sensors of sensor unit 205 to accurately detect the light emitted from light source 115 and to reduce interference from other light sources. The sensors of sensor unit 205 can be photo-electric devices, low resolution video cameras, or any other type of light-sensitive electronic device known in the art. In further embodiments, receiver portion 200 includes one or more additional sensor units similar to sensor unit 205, such as sensor units 210 and 215. By way of example, the sensor units 205, 210, and 215 may be arranged in a linear array or a two-or three-dimensional pattern.

Processing unit 220 receives signals from sensor unit 205, and optionally sensor units 210, 215, and any other sensor units of the receiver portion 200. Processing unit 220 can be any type of information processing device capable of processing digital and/or analog information. Processing unit 220 evaluates these signals to determine if the user has specified a target point, and if so, the position of this target point. In an embodiment, the processing unit 220 is programmed with the physical configuration of the target area and the positions of the sensor units with respect to the target area, and uses this information in conjunction with the signals received from the sensor units to determine the position of the target point within the target area. As discussed in detail below, the one or more sensor units of an embodiment of the receiver portion 200 are positioned at the periphery of the target area in such a manner as to enable the receiver portion 200 to determine the target point specified by the user with the sender portion 100.

In an embodiment, processing unit 220 provides the position of the target point to a device connected with or including a display device. The device uses the location of the target point to position an on-screen pointer or other user interface element. Example devices can include televisions; DVD, Blu-Ray, HD-DVD, or other formats of video players and recorders; digital or personal video recorders; cable and satellite set-top boxes; and video game consoles. In an embodiment, the device receives the position of the target point via a wired or wireless data interface, such IEEE-1394 (e.g. Firewire or iLink), USB, Bluetooth, wireless USB, and wireless networking interfaces (e.g. 802.11). In another embodiment, all or part of the receiver portion 200 is integrated within the device connected with or including a display device. For example, a television set can include one or more sensor units around the periphery of the screen and a processing unit. In a further embodiment, the functions of the processing unit 220 are performed by one or more microprocessors or microcontrollers included in the device and that may also be used to implement other device functions.

Figure 3A:
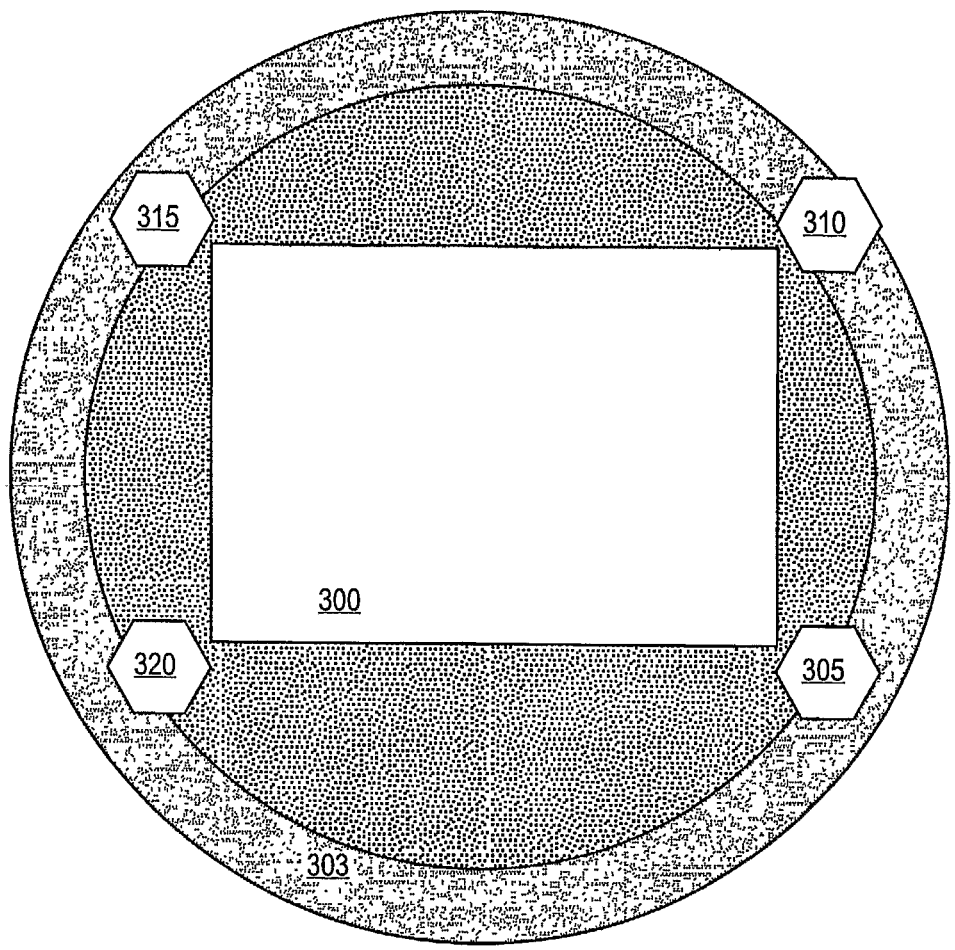
FIG. 3A-3B illustrates an example arrangement and operation of receiver sensors according to an embodiment of the invention.
Figure 3B:
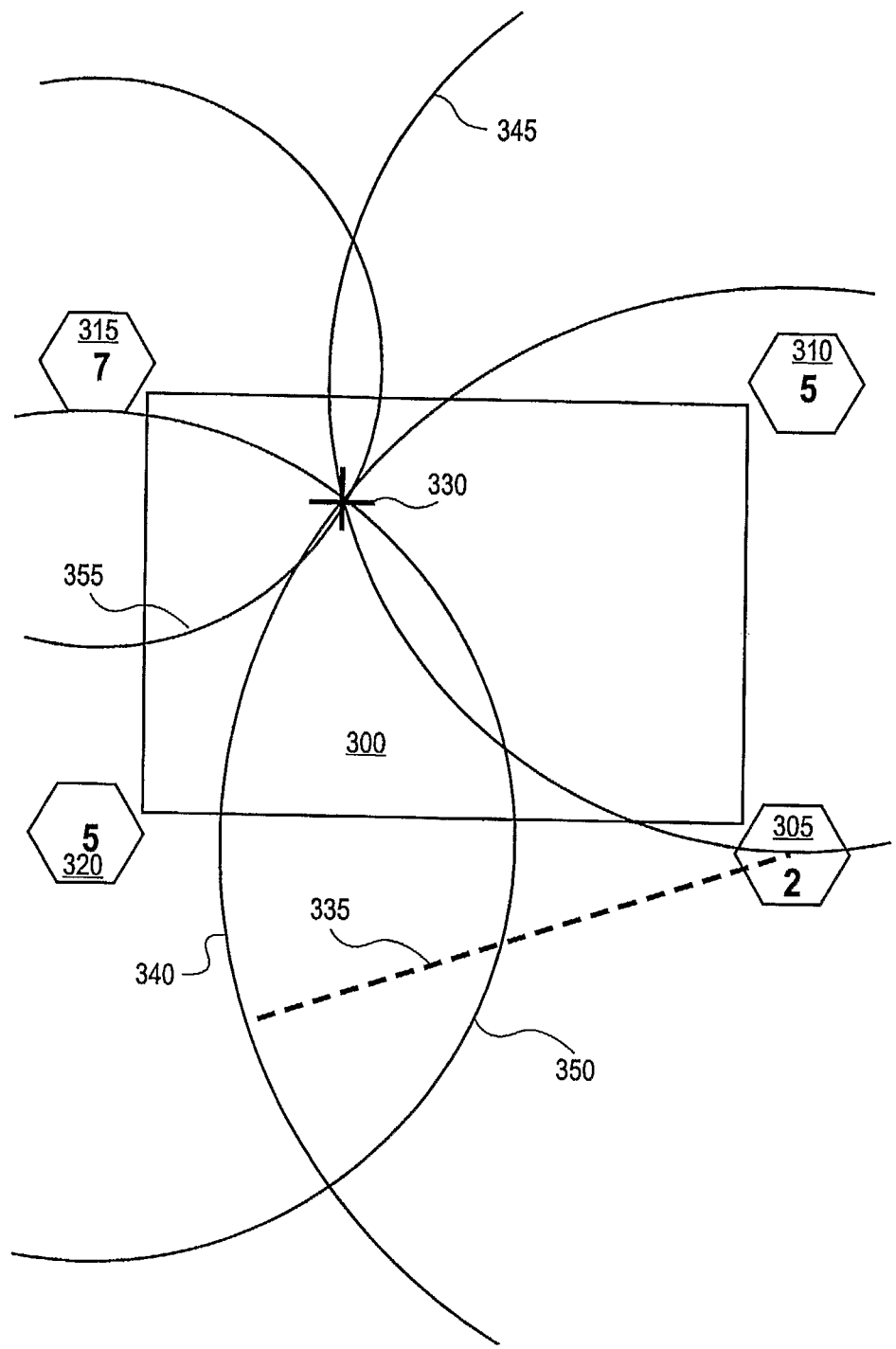

FIG. 3A-3B illustrates an example arrangement and operation of receiver sensors according to an embodiment of the invention. This embodiment is capable of providing an absolute position of the target point within a target area, or a relative motion of the target point from a previous position. In FIG. 3A, a target area 300, which can include the screen of a display device, is surrounded by four sensor units: 305, 310, 315, and 320. Such an array of sensors is sometimes referred to herein as a "quad sensor". Referring again to FIG. 2, the processing unit 220 may preferably pull data from a sensor unit in a quad sensor that is closer to a "hot spot" in the light intensity at the target area. Alternatively, The processing unit may average over all sensors in a particular quad sensor or over all sensors in an array. In alternate embodiments, additional sensor units can be included to improve performance and reduce interference from other light sources. The sender portion may project a pattern 303 on to the target area 300 and at least some of the sensor units. In certain embodiments, the sensor units 205, 210, 215 depicted in FIG. 2 and described above may each include a quad sensor as shown in FIG. 3A. It is noted that a greater number of sensors may provide a greater degree of resolution of variations in intensity of light at the target area 300.

FIG. 3B illustrates the determination of an example position of a target point according to an embodiment of the invention. The sender portion projects a pattern on to the target area 300 and the sensor units 305, 310, 315, and 320. The pattern is centered at the target point 330.

In an embodiment, the pattern 303 is a gradient pattern, in which the intensity of the light emitted from the sender portion decreases in proportion to the distance from the target point. To determine the position of the target point 330, an embodiment of the processing unit compares the intensity of the light from the pattern received by each of the sensor units. The processing unit transforms the light intensity value at each sensor unit into a distance value representing the distance from the sensor unit to the target point. For example, if the gradient pattern decreases intensity linearly from the center of the pattern, then the distance value is linearly proportional to the intensity value received by the sensor units. In other embodiments, the relationship between intensity and distance values may be non-linear, such as a logarithmic decay, to more accurately account for optical effects. Furthermore, the intensity pattern 303 may have any type of symmetry at the target area, e.g., circular symmetry, elliptical symmetry or other.

In an embodiment, by determining distance values for three or more sensor units, the processing unit can determine the location of the target point 330. FIG. 3B illustrates an example of this determination. In this example, sensor unit 305 receives an intensity value of 2 from the pattern projected by the sender portion. Based upon this intensity value, a distance value 335 may be calculated. This distance value 335 defines a radius of circle 340. Circle 340 represents a contour of constant light intensity, e.g., set of possible positions of the target point based on the distance value 335. Similarly, sensor units 310 and 320 each receive an intensity value of 5, which correspond to circles 345 and 350. (In this example, it is assumed that the gradient pattern projected by the sender portion is brightest in the center, so that higher intensity values correspond to smaller distance values.) Sensor unit 315 receives an intensity value of 7, which corresponds to circle 355. In this example, the intersection of circles 340, 345, 350, and 355 specify the position of the target point 330. It is noted that a similar procedure may be applied where the contours of constant light intensity are other than circular, e.g., elliptical or otherwise.

The system may be implemented in such a way as to allow a controller to access menu items on the screen like a mouse. Such an embodiment may be implemented using any type of controller. Examples of such controllers include, but are not limited to, controllers for televisions, video game consoles, personal computers, and the like. Such embodiments may be used to access menu items in a "cross-media bar menu". Examples of a "cross-media bar" menus are described, e.g., in U.S. patent application Ser. No. 10/874,863, entitled "FAST SCROLLING IN A GRAPHICAL USER INTERFACE" filed Jun. 22, 2004, and U.S. patent application Ser. No. 11/302,516, entitled "VOICE AND VIDEO CONTROL OF INTERACTIVE ELECTRONICALLY SIMULATED ENVIRONMENT", filed Dec. 12, 2005, the entire contents of both of which are incorporated herein by reference. Such embodiments may also be used to aim targets, including but not limited to first person shooter cross-hairs that overlay the cross-hair-mouse-targeted over a 3D environment.

In further embodiments, the processing unit determines an approximate position of the target point due to the margin of error in dispersing the pattern and measuring the intensity at each sensor unit. However, for many applications, determining an approximate position of the target point is adequate. If needed, additional sensor units, more precisely calibrated optics in the sender and receiver portions, different patterns, and/or more accurate sensors in the sensor units can reduce the margin of error.

In an additional embodiment, the intensity value received by one sensor unit is used as a reference value to determine the distance values associated with the other sensor units. For example, the highest or lowest intensity value received by any of the sensor units can be selected as a reference intensity value. The processing unit then scales the intensity values received from the remaining sensor units based on the reference intensity value and determines their distance values accordingly. By calculating distance from relative intensities, the processing unit compensates for the sender portion being located at varying distances from the receiver portion, for decreasing light output of the sender portion (for example due to battery wear), and other factors.

As discussed above, the processing unit can determine an absolute position of the target point by determining the intersection of the distance values from several sensor units. In a further embodiment, the processing unit can store one or more previously determined positions of the target point. These previously determined positions can be combined into a moving average or otherwise filtered to decrease small unwanted fluctuations in the position of the target point over time, such as those introduced by a user's unsteady hand, measurement error, and interference from other devices. Additionally, previously determined positions can be used to calculate the relative motion of the target point, rather than the absolute position.

Figure 4A:
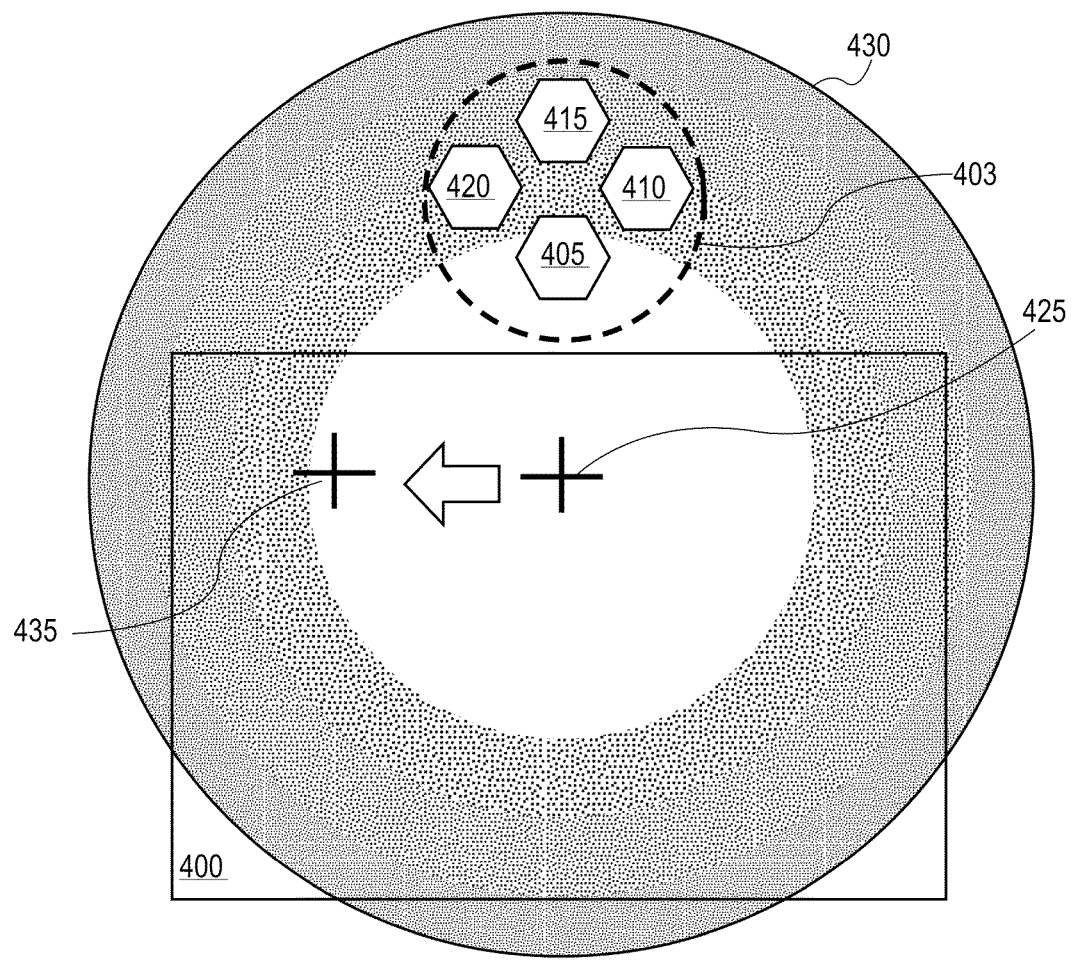
FIG. 4A-4C illustrates an example arrangement and operation of receiver sensors according to an embodiment of the invention.
Figure 4B:
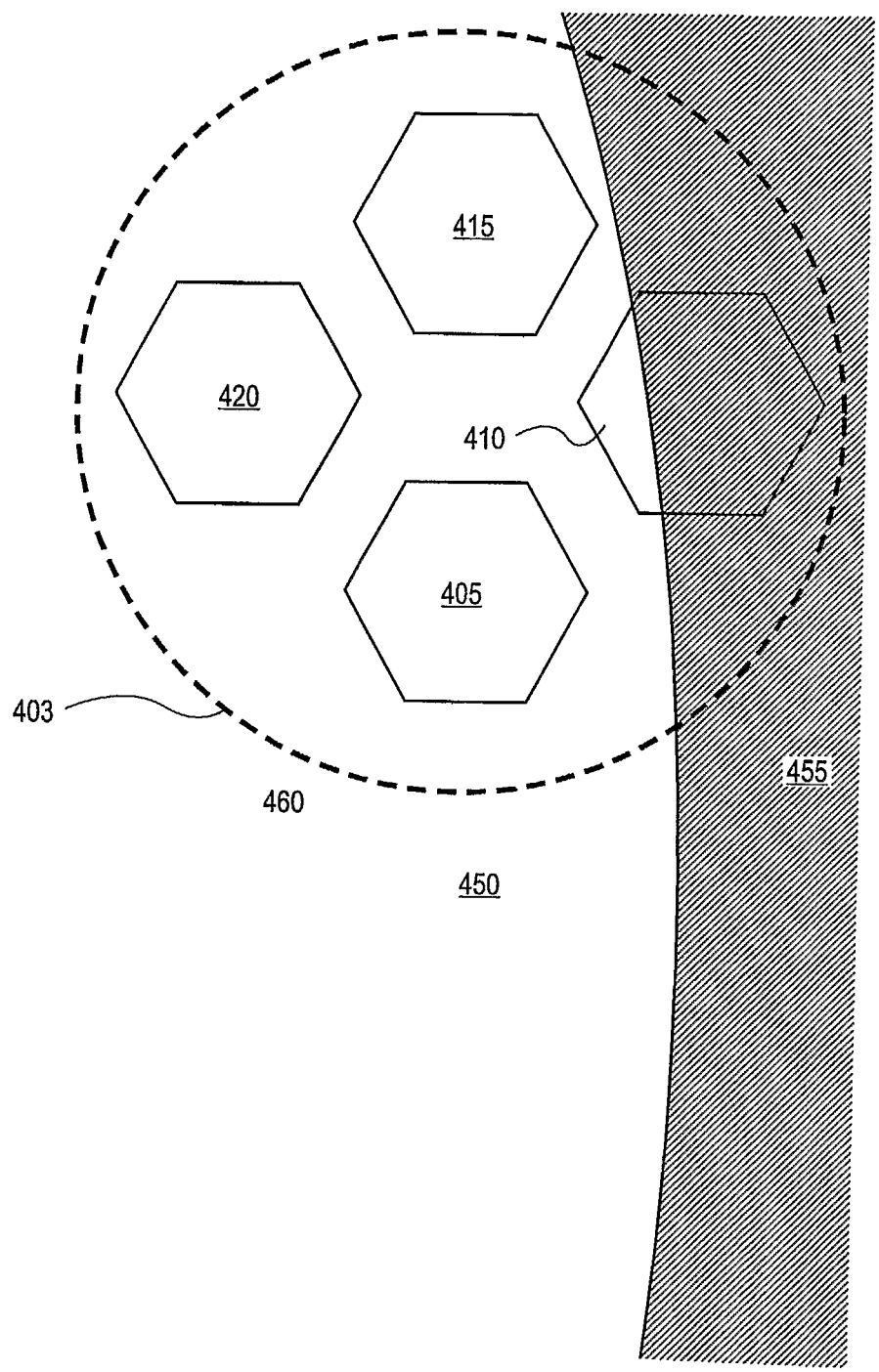
Figure 4C:
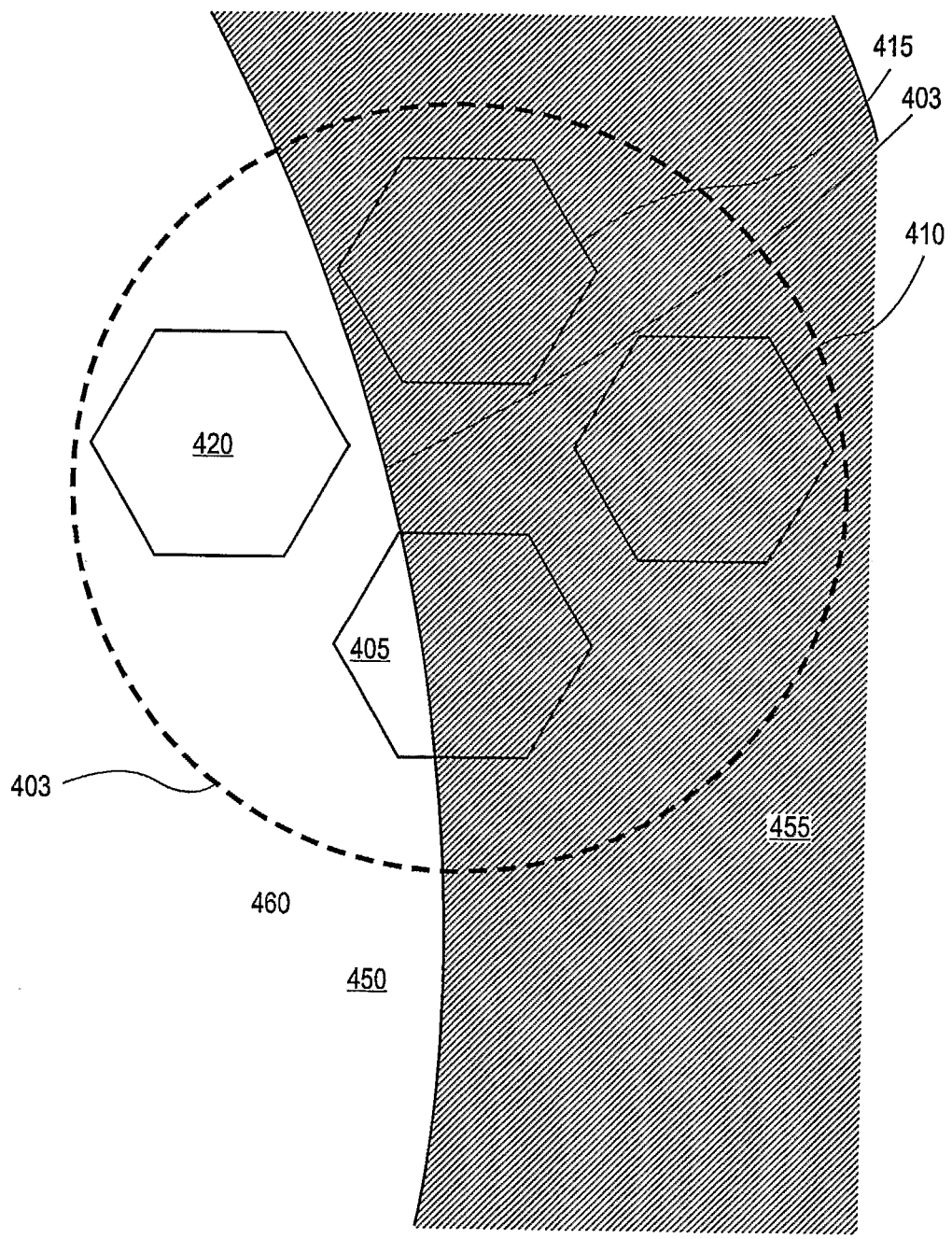

FIG. 4A-4C illustrates an example arrangement and operation of receiver sensors according to an embodiment of the invention. This embodiment is capable of providing a relative direction and quantity of motion of the target point within a target area. In FIG. 4A, a target area 400, which can include the screen of a display device, is surrounded by a sensor unit 403, which includes four individual sensors, 405, 410, 415, and 420, closely grouped together. In additional embodiments, there may be additional sensor units, each with multiple closely grouped sensors, positioned around the target area to improve performance and reduce interference from other light sources.

FIG. 4A illustrates the determination of the relative motion of a target point according to an embodiment of the invention. The sender portion projects a pattern 430 on to the target area 400 and the sensor unit 403 and its sensors 405, 410, 415, and 420. In this embodiment, the pattern 430 is centered at the location of the target point. In the example of FIGS. 4A-4C, the target point is initially located at position 425 and is gradually moved by the user to position 435.

In an embodiment, the pattern includes a set of concentric circles. As the pattern is moved across the target area, an embodiment of the processing unit detects the transitions between light and dark from the boundaries of the circles in the pattern. The number of transitions between light and dark is proportional to the magnitude of the relative motion of the target point. By comparing the timing of these transitions at two or more closely grouped sensors in the sensor unit 403, the processing unit can determine the direction of the relative motion. To accurately detect the direction of motion, the spacing between adjacent sensors in the sensor unit 403 should be smaller than the size of the circles, dots, or other elements of the pattern, when projected from typical user distances. This allows the processing unit to assume that transitions occurring at adjacent sensors in the sensor unit result from the same portion of the pattern. The number or density of circles in the pattern determines the relative sensitivity of this embodiment of the invention to the motion of the target point, with a higher density of circles in the pattern providing increased sensitivity.

In another embodiment, the pattern can include a set of randomly or pseudo-randomly distributed dots or speckles. Similar to the above embodiment, the processing unit detects transitions between light and dark as the pattern moves across the target area. As above, the number of transitions is proportional to the magnitude of the motion and the timing of transitions at closely grouped sensors in the sensor unit 403 specifies the direction of motion.

FIGS. 4B and 4C illustrate a portion of the pattern 430 as the target point is moved from position 425 to 435. In FIG. 4B, a portion 450 of pattern 430 is projected over the sensors 405, 410, 415, and 420 of the sensor unit 403. Portion 450 include a shaded area 455, such as a segment of a circle or a single dot in the pattern, and an unshaded area 460, such as the space between concentric circles or dots in the pattern. In the example of FIG. 4B, the shaded area 455 covers sensor 410, while sensors 405, 415, and 420 are in the unshaded area 460. In an embodiment, this configuration of the portion 450 of the pattern 430 is conveyed to the processing unit in the form of electrical signals from each sensor representing the amount of light received by each sensor.

FIG. 4C illustrates the change in position of the pattern as the target point moves from position 425 to position 435. In FIG. 4C, the portion 450 of pattern 430 has shifted to the left as a result of the movement of the target point. As a result, sensors 405 and 415 are now in the shaded area 455, rather than the unshaded area 460. The processing unit detects the transition of sensors 405 and 415 from the unshaded area 460 to the shaded area 455. These detected transitions indicate a movement of the target point by an amount proportional to the size of pattern features, such as the thickness of each circle or diameter of a dot or speckle. By comparing the timing of the transitions, the processing unit can determine the direction of pattern motion. For example, because sensor 410 transitioned to the shaded area 455 prior to sensors 405 and 415, the processing unit can determine that the pattern is moving from right to left. By arranging the sensors of the sensor unit appropriately, for example as shown in FIGS. 4A-4C, the processing unit can detect pattern transitions resulting from pattern motion along the horizontal and vertical axis, as well as any combination thereof.

Figure 5:
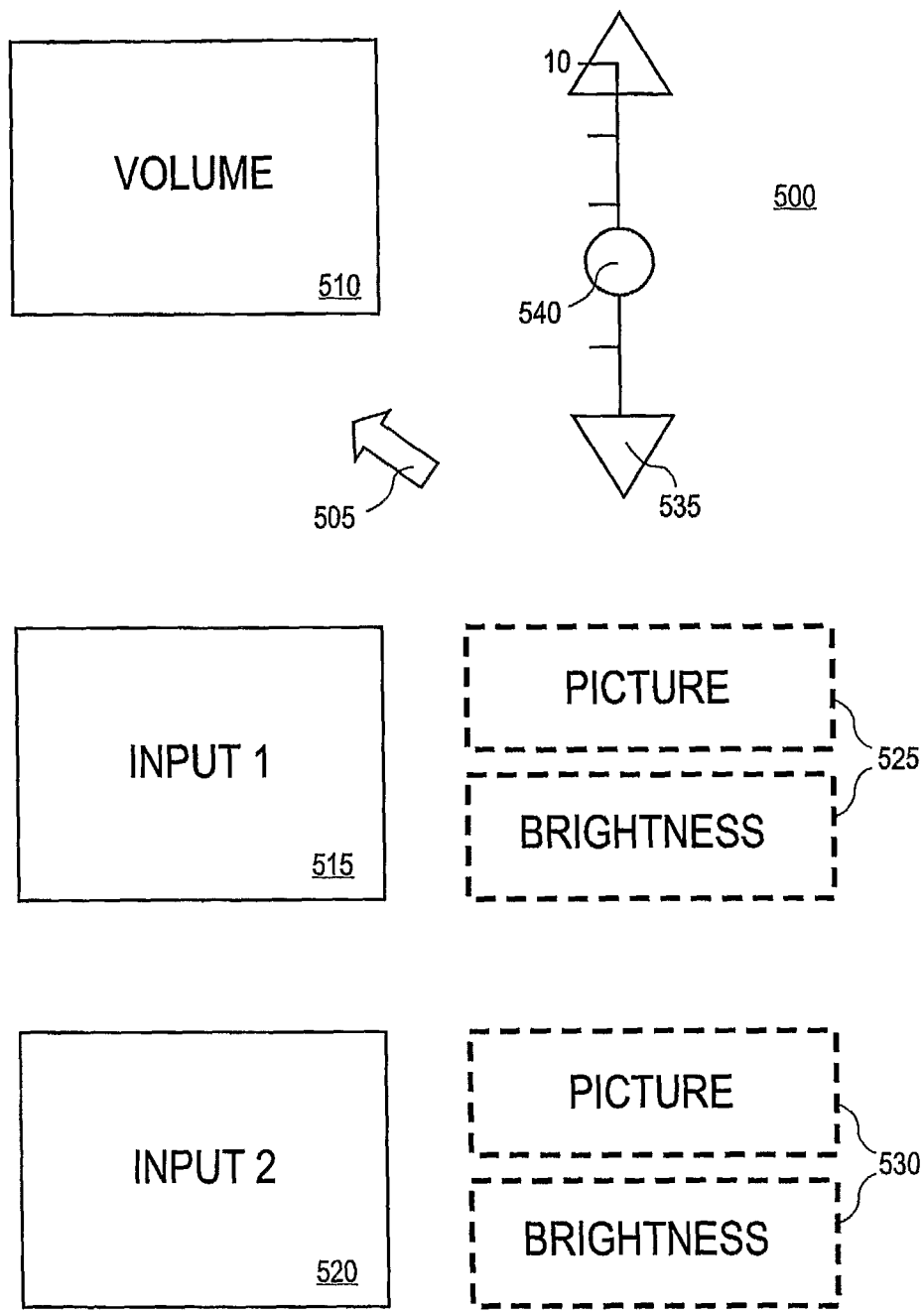
FIG. 5 illustrates an example on-screen graphical user interface according to an embodiment of the invention.

FIG. 5 illustrates an example on-screen graphical user interface 500 according to an embodiment of the invention. Interface 500 displays a pointer 505. The position of pointer 505 can be specified as an absolute position by the above-described absolute positioning embodiments. Alternatively, the pointer can be positioned at an initial default location and manipulated by the user using the above-described relative motion embodiments.

Interface 500 includes a set of icons including icons 510, 515, and 520. In an embodiment, icons represent functions of the display device or connected with the display device. For example, icon 510 controls the volume of audio and icons 515 and 520 control functions associated with different audio or video inputs of the device. In an embodiment, a user manipulates the sender portion discussed above to position the pointer 505 over an icon, thereby selecting the icon. In a further embodiment, the user presses a button on the sender portion to indicate that a selection is complete. The sender portion can modulate an additional control signal onto the light emitted from the light source to communicate this indication to the receiver portion. Embodiments of the sender portion can include one or more buttons or other control inputs for operating the example interface 500. Alternatively, the user can deactivate the light source of the sender portion, for example by releasing a button, to indicate a selection.

In a further embodiment, upon selecting an icon of the interface 500 using the pointer, one or more additional icons can be displayed to provide additional functions related to the previously selected icon. For example, interface 500 displays icon sets 525 and 530 when the user selects icons 515 or 520, respectively. For example, icon sets 525 and 530 enable adjustments to the picture and brightness settings of their associated inputs. In a further embodiment, the user can manipulate "virtual controls" intended to resemble physical buttons, switches, sliders, knobs, or other types of controls. Example virtual control 535 is a slider switch that can be manipulated by the user to adjust the value of a device parameter. In an embodiment, a user can manipulate the example virtual control 535 by selecting knob 540 with the pointer 505 and dragging the knob 540 to the desired position. In another embodiment, the selecting a related icon, for example icon 510, automatically maps any subsequent changes in target point position to the virtual control until the user indicates his or her selection is complete.

The pattern of light intensity projected by the sender portion 100 may produce a light intensity pattern at the target that depends upon the location and/or orientation of the sender portion. If the three-dimensional intensity pattern emitted by the light source 115 has a known or determinable form, information regarding the location and/or orientation of the sender portion 100 may be determined from measurement of the light intensity pattern at the target in a manner similar to that described above. In general, determination of the location and/or orientation of the sender portion 100 may be regarded as a problem of matching a one or more intensity measurements at known positions on the target to a known or determinable spatial distribution of light intensity from the light source 115.

Figure 6A:
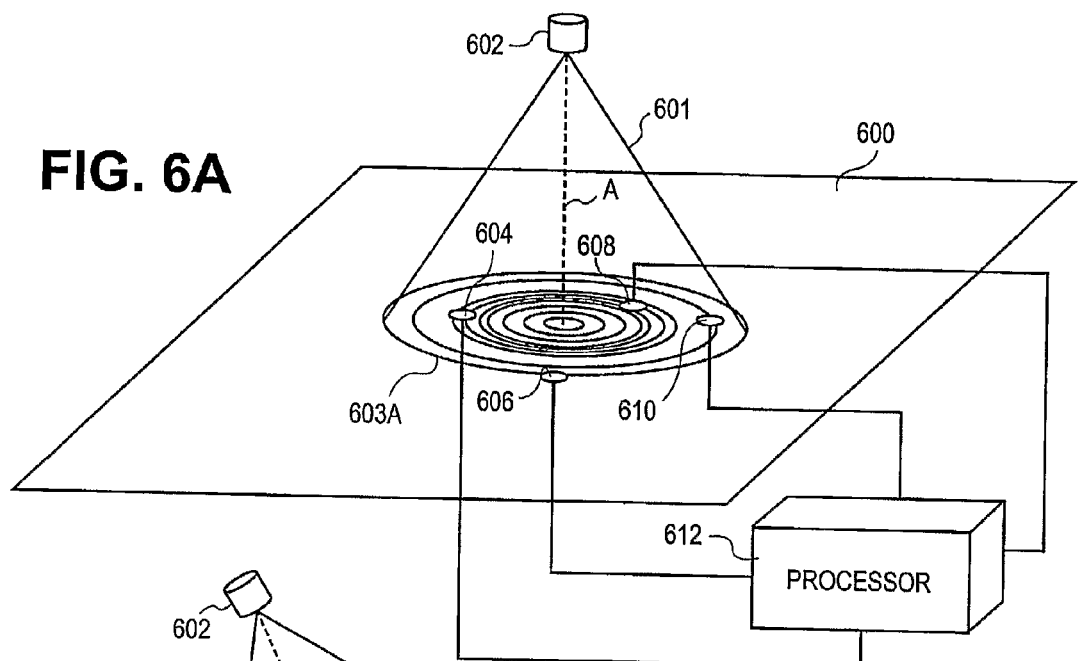
FIGS. 6A-6B illustrate examples of tracking a position and/or orientation of a light source using light sensors according to an embodiment of the invention.

For example, as shown in FIG. 6A, the light intensity pattern at a target 600 may be modeled mathematically as an intersection between a three-dimensional intensity pattern 601 of light emitted by a light source 602 and a surface of the target 600 or portion thereof. By way of example, the three-dimensional pattern 601 may be a cone having an elliptical or circular cross-section with a Gaussian intensity distribution that is symmetric across the cross-section with respect to an axis A of the cone and the target area may be a planar surface. By way of example, the pattern 601 may have a circular cross-section. If the axis of the cone is perpendicular to the target surface 600 the intersection may be characterized by circular contours 603A. The center of the contours 603A may represent the target point discussed above with respect to FIGS. 3A-3B and 4A-4C. The processor 612 may locate the center point of the contours 603A on the target 600 as described above, e.g., using sensors 604, 606, 608, 610, which may be coupled to a processor 612. By way of example, the sensors 604, 606, 608, 610 may be quad sensors. Alternatively, any number and type of sensors may be used. Furthermore, the sensors may be arranged in a coplanar or non-coplanar fashion.

If the intensity pattern of the contours 603A depends on a distance R between the target 600 and the source 602 it may also be possible for logic within the processor 612 to determine the location of the source 602 from the location of the target point and the distance R.

Figure 6B:
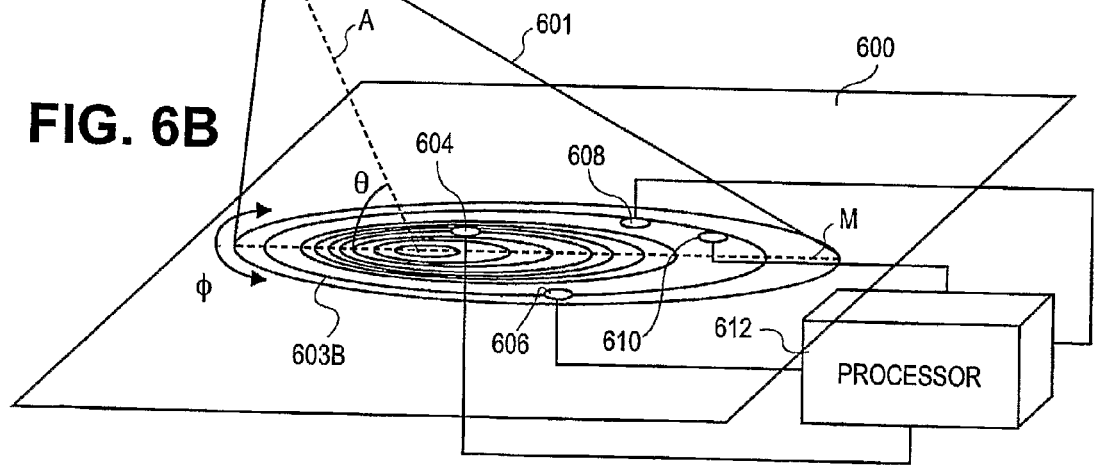

It is noted that the shape of the intersection between the target 600 and the three-dimensional light intensity pattern 601 may generally depend on both the location and orientation of the source 602. For example, as shown in FIG. 6B, if the source 602 is oriented such that the axis A of the light intensity pattern 601 is non-perpendicular to the target 600 intersection of the pattern 601 and target 600 may be characterized by contours 603B that are elliptical in shape and non-concentric. If the sensors 604, 606, 608, 610 provide sufficient information about the light intensity pattern 601 the processor 612 may determine the location and/or orientation of the source 602 relative to the target 600. For example, by comparing light intensity measurements at the sensors 604, 606, 608, 610 an orientation of a major axis M of the contours 603B may be determined. From the major axis M a bearing angle $\phi$ to the source 602 may be determined. Furthermore, if the axis M is orientated at an angle $\theta$ relative to a plane of the target 600, the contours 603B may be non-concentric and will affect the gradient of the light intensity at the target 600. Measurements with the sensors 604, 606, 608, 610 may also yield information about the gradient of the light intensity across the target 602. Such information may be analyzed to determine the angle $\theta$. In addition, combined information about the intensity at the different sensors 604, 606, 608, 610 may also yield information about an average intensity of light at the target 600. The processor 612 may relate the average intensity to the distance R from the target 600 to the source 602.

In embodiments of the present invention, the position and/or orientation and/or movement of the source 602 may be tracked in free space but mapped onto a two dimensional projection. By way of example, the two dimensional projection may be in terms of x and y coordinates with respect to a screen, such as a television or computer screen. Such embodiments may be implemented in a manner similar to mapping of the movements of a computer mouse mapping to movements of a cursor on a computer screen. Manipulations of the source 602 may be tracked along a fixed plane similar to tracking of a computer mouse on a table. The position and or movement of the source may be projected onto the screen. By way of example, the projected position or movement of the source 602 may be fixed with respect to the plane depth of the screen but is otherwise free to operate along X and Y axis. Alternatively, the Z-axis depth perpendicular to the screen may also be tracked. And in one mode, the Z-axis depth may be selected, e.g., via rotation of the controller. Rotation of the source 602 about an axis A may be sensed e.g., by sensing the rotation of the projected light intensity pattern 601 (e.g., through sensing of features in the pattern such as speckles) or though a rotation sensor that might be present in a controller to which the source 602 is mounted. Such rotation may be used, e.g., to influence controls on a screen display. For example, in the case of the knob 540 of FIG. 5, the rotation of the source 602 could be used to control twisting of the knob 540.

It is noted that the concepts discussed above with respect to FIG. 6A-6B may be applied more generally to any arbitrary distribution of light intensity from the source 602 and to any arbitrary non-flat shape of the surface of the target 600.

In some embodiments of the invention, the radiation from the source 602 may be modulated with respect to time with some characteristic frequency. By way of example, and without limitation, the source 602 may include an acousto-optic modulator to modulate the light in response to an electrical signal that varies with the characteristic frequency. The processor may include logic that analyzes differences in the time of arrival of modulated light from the source 602 at the detectors 604, 606, 608, 610. By appropriate analysis of the differences in time of arrival of the modulated light at the detectors 604, 606, 608, 610 the processor 612 may determine a direction to the source 602, e.g., in terms of a bearing angle $\phi$ and azimuth angle $\theta$. Determination of a direction to a source using time of arrival delays and semi-blind source separation is described, e.g., in U.S. patent application Ser. No. 11/381,729, to Xiadong Mao filed May 4, 2006 and entitled ULTRA SMALL MICROPHONE ARRAY, which is incorporated herein by reference. In certain embodiments, the sensors 604, 606, 608, 610 may replace the microphones described in U.S. application Ser. No. 11/381,729 and light source 602 may replace the sound source described in U.S. application Ser. No. 11/381,729. Otherwise, the determination of the direction to the source 602 may proceed as set forth in U.S. application Ser. No. 11/381,729. The spacing of the sensors 604, 606, 608, 610 may be chosen to account for the faster speed of light. Furthermore directions to the source 602 may be pre-calibrated, e.g., in the form of one or more pre-calibrated zones. An example of precalibration of listening zones in the context of a microphone array and sound source is set forth in U.S. patent application Ser. No. 11/381,724 to Xiadong Mao et al., filed May 4, 2006 and entitled METHODS AND APPARATUS FOR TARGETED SOUND DETECTION AND CHARACTERIZATION, which is incorporated herein by reference. The sensors 604, 606, 608, 610, 612 may substitute for the microphone array and the source 602 may substitute for the sound source of application Ser. No. 11/381,724.

In embodiments of the present invention, the sender portion may be part of a video game system and method. Examples of suitable video game systems and methods are described, e.g., in U.S. patent application Ser. Nos. 11/382,250, 11/382,252, 11/382,256, filed May 8, 2006, U.S. patent application Ser. Nos. 11/382,039 and 11/382,043 filed on May 7, 2006, and U.S. patent application Ser. Nos. 11/382,031, 11/382,032, 11/382,033, 11/382,034, 11/382,035 and 11/382,037 filed May 6, 2006, all of which have been incorporated herein by reference.

Various embodiments of the methods, apparatus, schemes and systems described herein may be applied to detecting, capturing and tracking the movements, motions and/or manipulations of an entire game controller body by a user. The detected movements, motions and/or manipulations of the entire controller body by the user may be used as additional commands to control various aspects of the game or other simulation being played.

Detecting and tracking a user's manipulations of a game controller body may be implemented in different ways. For example, in addition to tracking the controller using a light source on the controller and light sensors as described above, an inertial sensor, such as an accelerometer or gyroscope, an image capture unit, such as a digital camera, can be used with the computer entertainment system to detect motions of the hand-held controller body and transfer them into actions in a game. Examples of tracking a controller with an inertial sensor are described, e.g., in U.S. patent application Ser. No. 11/382,033, entitled "SYSTEM, METHOD, AND APPARATUS FOR THREE-DIMENSIONAL INPUT CONTROL", which is incorporated herein by reference. Examples of tracking a controller using image capture are described, e.g., in U.S. patent application Ser. No. 11/382,034, entitled "SCHEME FOR DETECTING AND TRACKING USER MANIPULATION OF A GAME CONTROLLER BODY", which is incorporated herein by reference. In addition, the controller and/or the user may also be tracked acoustically using a microphone array and appropriate signal processing. Examples of such acoustic tracking are described in U.S. patent application Ser. No. 11/381,721, which is incorporated herein by reference.

Light sensing, acoustic sensing, inertial sensing and image capture can be used individually or in any combination to detect many different types of motions of the controller, such as for example up and down movements, twisting movements, side to side movements, jerking movements, wand-like motions, plunging motions, etc. Such motions may correspond to various commands such that the motions are transferred into actions in a game. Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc. A game program may be configured to track the motion of the controller and recognize certain pre-recorded gestures from the tracked motion. Recognition of one or more of these gestures may trigger a change in the game state.

In certain embodiments of the present invention controller path information obtained from these different sources may be mixed prior to analysis for gesture recognition. The tracking data from different sources (e.g., acoustic, inertial and image capture) may be mixed in a way that improves the likelihood of recognition of a gesture. Furthermore, controller tracking data may be combined with more conventional controller signals.

Figure 7:
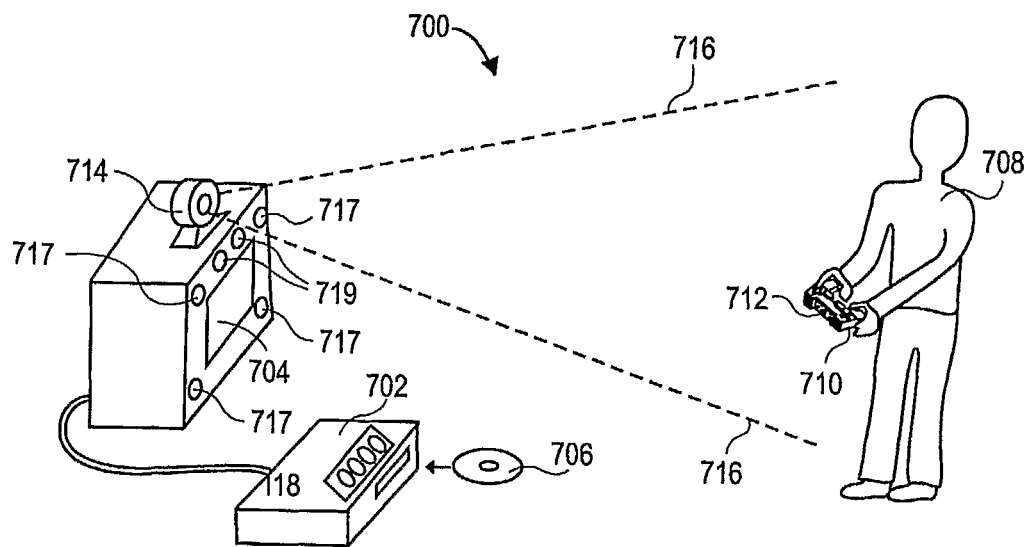
FIG. 7 is a pictorial diagram illustrating a video game system that operates in accordance with an embodiment of the present invention.

Referring to FIG. 7, there is illustrated a system 700 that operates in accordance with an embodiment of the present invention. As illustrated, a computer entertainment console 702 may be coupled to a television or other video display 704 to display the images of the video game or other simulation thereon. The game or other simulation may be stored on a DVD, CD, flash memory, USB memory, or other memory media 706 that is inserted into the console 702. A user or player 708 manipulates a game controller 710 to control the video game or other simulation. The game controller 710 may include conventional control input devices, e.g., joysticks 711, buttons 713, R1, L1, and the like.

Figure 8:
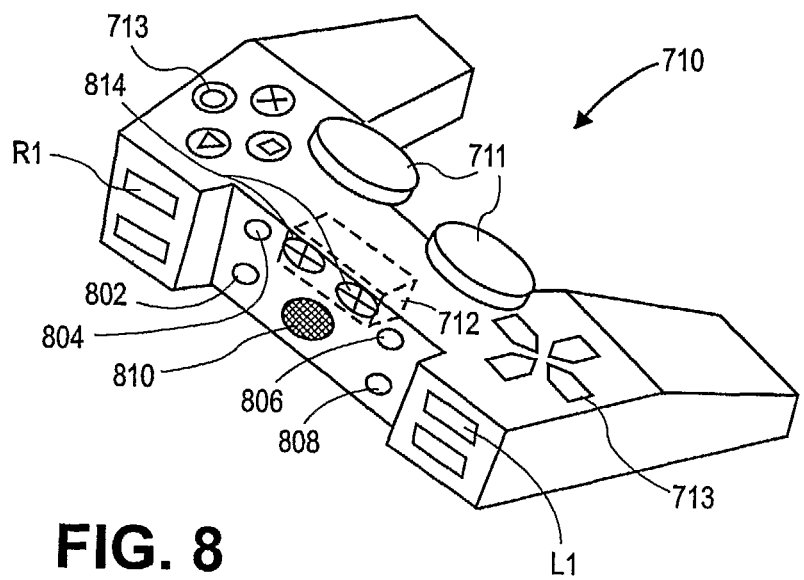
FIG. 8 is a perspective view of a controller made in accordance with an embodiment of the present invention.

As seen in FIG. 8, the game controller 710 may include an inertial sensor 712 that produces signals in response to the position, motion, orientation or change in orientation of the game controller 710. By way of example and without limitation, the inertial sensor 712 may be an accelerometer, gyroscope or tilt sensor. Examples of a suitable accelerometers are described e.g., in U.S. patent application Ser. Nos. 11/382,033, 11/382,035, and 11/382,252, which have been incorporated herein by reference. Data from signals obtained from the inertial sensor 712 may be used to calculate many physical aspects of the movement of the controller 710, such as for example its acceleration and velocity along any axis, its tilt, pitch, yaw, roll, as well as any telemetry points of the controller 710. As used herein, telemetry generally refers to remote measurement and reporting of information of interest to a system or to the system's designer or operator.

An image capture device 714 may be positioned so that the controller 710 is within its field of view 716. Images obtained by the image capture device 714 may be analyzed to track the motion of the controller 710 and/or the user 708. As shown in FIG. 8, the controller 710 may optionally be equipped with light sources such as light emitting diodes (LEDs) 802, 804, 806, 808 to facilitate tracking by video analysis. These may be mounted to a body of the controller 710. As used herein, the term "body" meant to describe the part of the game controller 710 that one would hold by hand (or wear if it were a wearable game controller). The LEDs 802, 804, 806, 808 or other light sources may facilitate analysis of video images for the purpose of tracking the controller 710 e.g., as described, in U.S. patent application Ser. No. 11/382,034. Furthermore, one or more of the LEDs 802, 804, 806, 808 may also be used in conjunction with one or more light sensors 717 to track the position of the controller 710, e.g., as described above with respect to FIGS. 6A-6B.

In embodiments of the present invention the locations of the light sources 802, 804, 806, 808 and light sensors 717 may be reversed whereby the controller 710 may not be the emitter but may comprise the detector. In this configuration, the controller 710 may be configured with one or more light sensors 814, e.g., in the form of a light sensor bar array. One or more light sources 719 may be located proximate the video display 704. The light sources 719 may be strobed by time or by wavelength and signals from the emitters may be received by the light sensors 814 located on the controller 710. The light sources 719 may include one or more pixels on the video display 704. Such pixels may be strobed in a pattern that may be detected by the light sensors 814 on the controller 710. The controller light sensors 814 may track a location and/or motion and/or orientation of the light sources 719 relative to the controller 710 and transmit data related to such relative location and/or motion and/or orientation. Any type of light sensor may be used as the controller light sensors 814 to the console 702 wirelessly or otherwise. By way of example, the controller light sensors 814 may be in the form of one or more quad sensors or charge coupled devices (CCD), image capture units (e.g., digital cameras) or some combination of two or more of these.

In some embodiments, the functions of the light sources 802, 804, 806, 808 and the light sensors 814 may be combined in one or more sensor emitter elements where each element in the quad includes an emitter (e.g., an IR emitter) paired with a light detector. Such an element, referred to herein as a "sensor/emitter" may operate in full-duplex to be either a source or a receiver or both. Such sensor/emitters may be aligned in any number and in any configuration. By way of example, two or more sensor/emitters may be paired together or aligned in a rectangular formation.

The console 702 may also include an acoustic transducer, such as a microphone array 718. The controller 710 may also include an acoustic signal generator 810 (e.g., a speaker) to provide a source of sound to facilitate acoustic tracking of the controller 710 with the microphone array 718 and appropriate acoustic signal processing, e.g., as described in U.S. patent application Ser. No. 11/381,724, which is incorporated herein by reference. In some embodiments, the locations of the acoustic transducer 718 and acoustic signal generator 810 may be reversed.

During operation, the user 708 physically moves the controller 710. For example, the controller 710 may be moved in any direction by the user 708, such as up, down, to one side, to the other side, twisted, rolled, shaken, jerked, plunged, etc. These movements of the controller 710 itself may be detected and captured by way of tracking through analysis of signals from the inertial sensor 712, the image capture device 714, light sensors 717 and/or microphone(s) 718.

The ability to detect and track the movements of the controller 710 makes it possible to determine whether any predefined movements of the controller 710 are performed. That is, certain movement patterns or gestures of the controller 710 may be predefined and used as input commands for the game or other simulation. For example, a plunging downward gesture of the controller 710 may be defined as one command, a twisting gesture of the controller 710 may be defined as another command, a shaking gesture of the controller 710 may be defined as another command, and so on. In this way the manner in which the user 708 physically moves the controller 710 is used as another input for controlling the game, which provides a more stimulating and entertaining experience for the user. It is noted further that embodiments of the present invention may be implemented in tracking of controllers for electronic devices other than video games.

Figure 9:
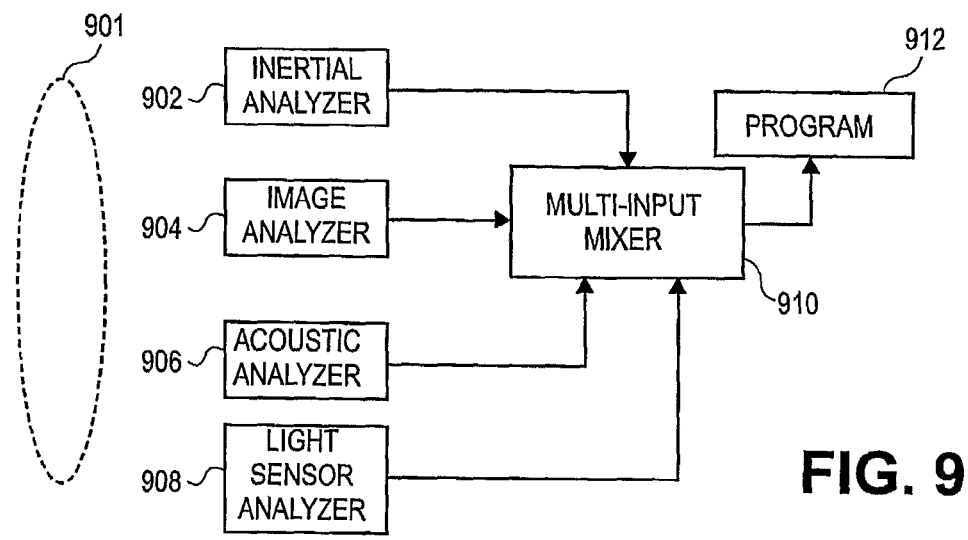
FIG. 9 is a block diagram of a system for mixing various control inputs according to an embodiment of the present invention.

As discussed above, data from light sensor, inertial, image capture and acoustic sources may be analyzed to generate a path that tracks the position and/or orientation of the controller 710. As shown in the block diagram of FIG. 9 a system 900 according to an embodiment of the invention may include an inertial analyzer 902, an image analyzer 904, an acoustic analyzer 906 and a light sensor analyzer 908.

The inertial analyzer 902 may be as described in U.S. patent application Ser. No. 11/382,033, entitled "SYSTEM, METHOD, AND APPARATUS FOR THREE-DIMENSIONAL INPUT CONTROL", filed on May 6, 2006, U.S. patent application Ser. No. 11/382,035, entitled "INERTIALLY TRACKABLE HAND-HELD CONTROLLER", filed on May 6, 2006 and U.S. patent application Ser. No. 11/382,252, entitled "TRACKING DEVICE FOR USE IN OBTAINING INFORMATION FOR CONTROLLING GAME PROGRAM EXECUTION", filed on May 8, 2006, the entire disclosures of all of which are incorporated herein by reference. The image analyzer 904 may be as described e.g., in U.S. patent application Ser. No. 11/382,034, entitled SCHEME FOR DETECTING AND TRACKING USER MANIPULATION OF A GAME CONTROLLER BODY, which is incorporated herein by reference. The acoustic analyzer, may be as described, e.g., in U.S. patent application Ser. No. 11/381,721, which is incorporated herein by reference. The light sensor analyzer may operate as described above, e.g., with respect to FIGS. 6A-6B.

Each of these analyzers may receive signals from a sensed environment 901. The analyzers 902, 904, 906, and 908 may be implemented in hardware, in software (or firmware) or some combination of two or more of these. Each of the analyzers produces tracking information related the position and/or orientation of an object of interest. By way of example, the object of interest may be the controller 710 referred to above. The inertial analyzer 902 may operate in connection with and to form fields below and with respect to methods described in U.S. patent application Ser. No. 11/382,033, which has been incorporated herein by reference. The image analyzer 904 may operate in connection with and to form fields below and with respect to methods described in U.S. patent application Ser. No. 11/382,034, which has been incorporated herein by reference. The acoustic analyzer 906 may operate in connection with and to form fields below and with respect to methods described in U.S. patent application Ser. No. 11/381,724. The light sensor analyzer 908 may operate in connection with and to form fields below and with respect to the tracking technique described above, e.g., with respect to FIGS. 6A-6B.

The analyzers 902, 904, 906 and 908 may be regarded as being associated with different channels of inputs of position and/or orientation information. The Mixer 908 may accept multiple input channels and such channels may contain sample data characterizing the sensed environment 901, typically from the perspective of the channel. The position and/or orientation information generated by the inertial analyzer 902, image analyzer 904 and acoustic analyzer 906 can be coupled into the input of a mixer 910. The Mixer 910 and analyzers 902, 904, 906 and 908 may be queried by a software program 912 (e.g., a game program) and may be configured to interrupt game software in response to events. Events may include gesture recognition events, gearing changes, configuration changes, setting noise levels, setting sampling rate, changing mapping chains, etc, examples of which are discussed below. The mixer 910 may operate in connection with and to form fields below and with respect to methods described herein.

Figure 10A:
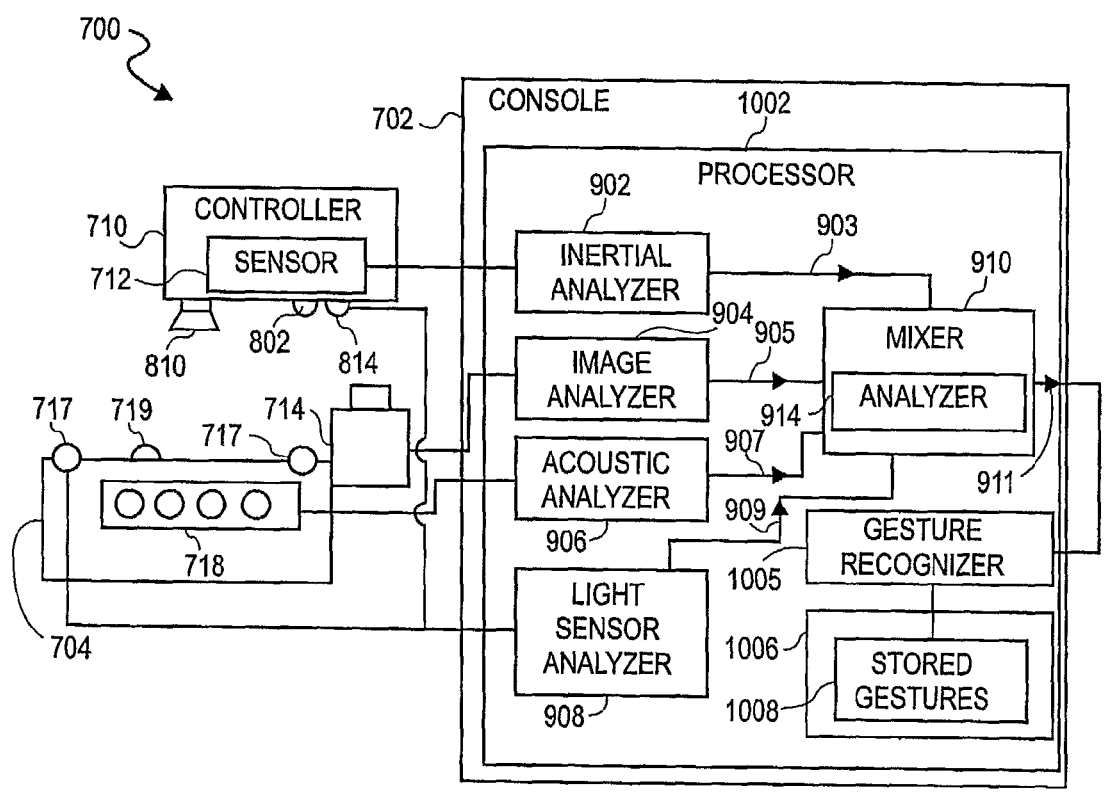
FIG. 10A is a block diagram of a portion of the video game system of FIG. 7.

As discussed above, signals from different input channels, e.g., inertial sensors, video images and/or acoustic sensors may be analyzed by the inertial analyzer 902, image analyzer 904, acoustic analyzer 906 and light sensor analyzer 908 respectively, to determine the motion and/or orientation of the controller 710 during play of a video game according to an inventive method. Such a method may be implemented as a series of processor executable program code instructions stored in a processor readable medium and executed on a digital processor. For example, as depicted in FIG. 10A, the video game system 700 may include on the console 702 having the inertial analyzer 902, image analyzer 904, acoustic analyzer 906 and light sensor analyzer 908 implemented either in hardware or software. By way of example, the analyzers 902, 904, 906 and 908 may be implemented as software instructions running on a suitable processor unit 1002. By way of example, the processor unit 1002 may be a digital processor, e.g., a microprocessor of a type commonly used in video game consoles. A portion of the instructions may be stored in a memory 1006. Alternatively, the inertial analyzer 902, image analyzer 904, acoustic analyzer 906 and light sensor analyzer 908 may be implemented in hardware, e.g., as an application specific integrated circuit (ASIC). Such analyzer hardware may be located on the controller 710 or on the console 702 or may be remotely located elsewhere. In hardware implementations, the analyzers 902, 904, 906 and 908 may be programmable in response to external signals e.g., from the processor 1002 or some other remotely located source, e.g., connected by USB cable, wireless connection, or over a network.

The inertial analyzer 902 may include or implement instructions that analyze the signals generated by the inertial sensor 712 and utilize information regarding position and/or orientation of the controller 710. Similarly, the image analyzer 704 may implement instructions that analyze images captured by the image capture unit 714. In addition, the acoustic analyzer may implement instructions that analyze images captured by the microphone array 718. Furthermore, the light sensor analyzer 908 may analyze light signals received at the light sensors 717 from the controller light sources 802, 804, 806, 808 located on the controller 710 and/or may analyze light signals received at the controller light sensors 814 from the light sources 719 located proximate the video display 704.

Figure 10B:
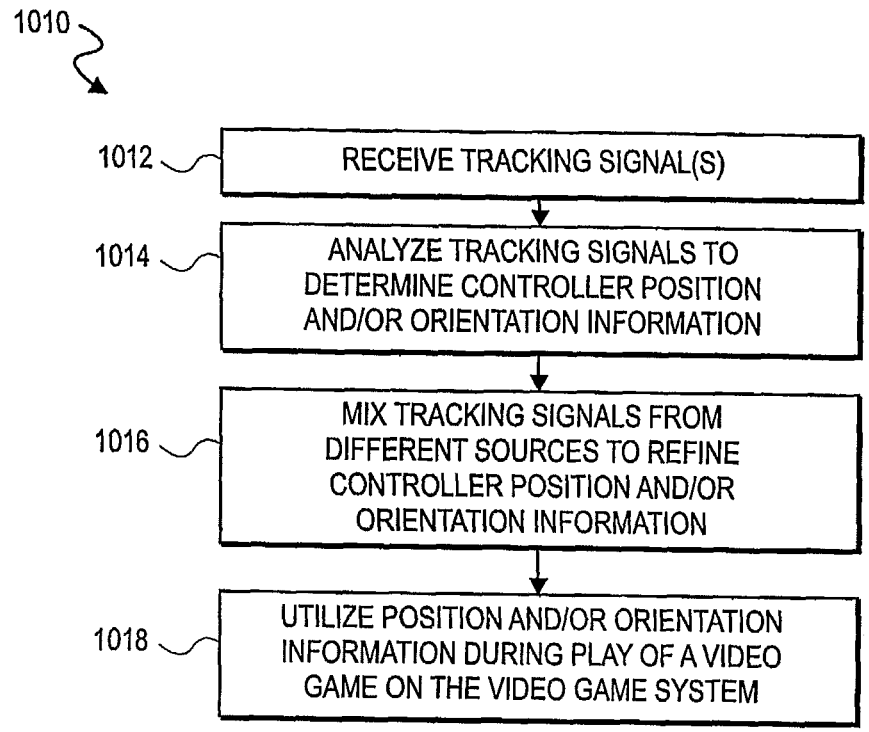
FIG. 10B is a flow diagram of a method for tracking a controller of a video game system according to an embodiment of the present invention.

As shown in the flow diagram 1010 of FIG. 10B these signals and/or images may be received by the analyzers 902, 904, 906 and 908 as indicated at block 1012. The signals and/or images may be analyzed by the analyzers 902, 904, 906 and 908 to determine inertial tracking information 903, image tracking information 905, acoustic tracking information 907 and light sensor tracking information 909 regarding the position and/or orientation of the controller 710 as indicated at block 1014. The tracking information 903, 905, 907, 909 may be related to one or more degrees of freedom. It is preferred that six degrees of freedom are tracked to characterize the manipulation of the controller 710 or other tracked object. Such degrees of freedom may relate to the controller tilt, yaw, roll and position, velocity or acceleration along the x, y and z-axis.

As indicated at block 1016, the mixer 910 mixes the inertial information 903, image information 905, acoustic information 907 and light sensor tracking information 909 to generate refined position and/or orientation information 911. By way of example, the mixer 910 may apply different weights the inertial, image, acoustic and light sensor tracking information 903, 905, 907, 909 based on game or environmental conditions and the take a weighted average. In addition, the mixer 910 may include its own mixer analyzer 1010 that analyzes the combined position/orientation information and generates its own resulting "mixer" information that involves combinations of the information generated by the other analyzers.

In an embodiment of the present invention the mixer 910 may assign a distribution value to the tracking information 903, 905, 907, 909 from the analyzers 902, 904, 906, 908. As noted above, certain sets of input control data obtained from the tracking information may be averaged. In alternative embodiments, however, the input control data may be assigned a value prior to its being averaged whereby input control data obtained from some analyzers is of more analytical importance than from others.

The mixer 910 may take on a number of functionalities in the context of the present system including observation, correction, stabilization, derivation, combination, routing, mixing, reporting, buffering, interrupting other processes and analysis. Such may be performed with respect to the tracking information 903, 905, 907, 909 received from one or more of the analyzers 902, 904, 906, 908. While each of the analyzers 902, 904, 906, 908 may receive and/or derive certain tracking information, the mixer 910 may be implemented to optimize the use of the received tracking information 903, 905, 907, 909 and generate refined tracking information 911.

In an embodiment, the controller 710 may be tracked in a "full duplex" mode in which the controller light sensors 814 track relative position and/or motion and/or orientation of the remote light sources 719 and/or the video display 704 and the image capture unit 714 and/or remote light sensors 717 track the relative position and/or motion and/or orientation of the controller 710 either through image analysis or spatial variation of light intensity from the light sources 802, 804, 806, 808 on the controller 710. Such full-duplex tracking of and with the controller may provide redundancy to gain accuracy in position tracking. In such embodiments the remote light sources 719 may be located on, near the video display 704. Alternatively light sources may be generated by the video display via strobed pixels.

In embodiments of the invention, the light sources 802, 804, 806, 808 (whether part of sensor/emitter units or otherwise) may be distinguished by different strobe patterns and/or different wavelengths. Although four light sources are shown in a rectangular pattern, in FIG. 8, any number of light sources may be arranged in any suitable pattern. By way of example, the light sources 802, 804, 806, and 808 may each be modulated differently so that each vertex of the array of light sources may be individually discriminated for upon detection by the image capture unit 714 and/or light sensors 717. The controller light sensor 814 may be part of a quad sensor/emitter operating as a sensor that reads referential light sources in or around the video display 704. Furthermore, the image capture unit 714 may also track motion of the controller 710, e.g., by reading a quad sensor/emitter operating as an emitter. Information from the image capture unit 714 and light sensors 719, 814, may be analyzed by the light sensor analyzer 908 and/or image analyzer 904 and further processed by the mixer 910.

In some embodiments it may be desirable for the analyzers 902, 904, 906, 908 and mixer 910 to provide tracking information similar output formats. Tracking information parameters from any analyzer element 902, 904, 906, 908 may be mapped to a single parameter in an analyzer. Alternatively, the mixer 910 may form tracking information for any of the analyzers 902, 904, 906, 908 by processing one or more tracking information parameters from one or more of analyzers 902, 904, 906, 908. The mixer 910 may combine two or more elements of tracking information of the same parameter type taken from the analyzers 902, 904, 906, 908 and/or perform functions across multiple parameters of tracking information generated by the analyzers to create a synthetic set of output having the benefit of being generated from multiple channels of input.

The refined tracking information 911 may be utilized during play of a video game with the system 700 as indicated at block 1018. In certain embodiments, the position and/or orientation information may be used in relation to gestures made by the user 708 during game play. In some embodiments the mixer 910 may operate in conjunction with the gesture recognizer 1005 to associate at least one action in a game environment with one or more user actions from the user (e.g., manipulation of the controller in space).

Figure 10C:
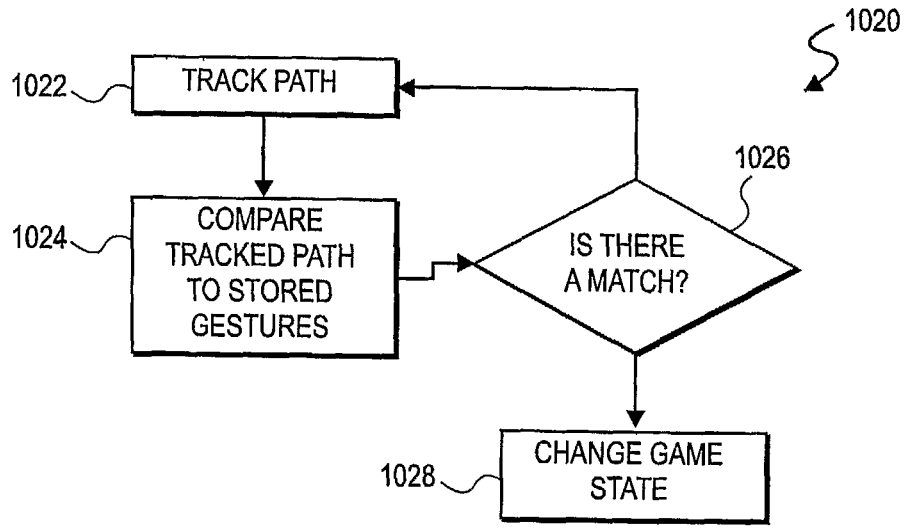
FIG. 10C is a flow diagram illustrating a method for utilizing position and/or orientation information during game play on a video game system according to an embodiment of the present invention.

As indicated in the flow diagram 1020 of FIG. 10C, a path of the controller 710 may be tracked using the position and/or orientation information as indicated at block 1022. By way of example, and without limitation, the path may include a set of points representing a position of the center of mass of the controller with respect to some system of coordinates. Each position point may be represented by one or more coordinates, e.g., X, Y and Z coordinates in a Cartesian coordinate system. A time may be associated with each point on the path so that both the shape of the path and the progress of the controller along the path may be monitored. In addition, each point in the set may have associated with it data representing an orientation of the controller, e.g., one or more angles of rotation of the controller about its center of mass. Furthermore, each point on the path may have associated with it values of velocity and acceleration of the center of mass of the controller and rates of angular rotation and angular acceleration of the controller about its center of mass.

As indicated at block 1024, the tracked path may be compared to one or more stored paths corresponding to known and/or pre-recorded gestures 1008 that are relevant to the context of the video game being played. Recognizer 1005 may be configured to recognize a user or process audio authenticated gestures, etc. For example, a user may be identified by the recognizer 1005 through a gesture and that a gesture may be specific to a user. Such specific gestures may be recorded and included among the pre-recorded gestures 1008 stored in memory 1006. The recordation process may optionally store audio generated during recordation of a gesture. The sensed environment is sampled into a multi-channel analyzer and processed. The processor may reference gesture models to determine and authenticate and/or identify a user or objects based on voice or acoustic patterns and to a high degree of accuracy and performance.

As indicated in FIG. 10A, data 1008 representing the gestures may be stored in the memory 1006. Examples of gestures include, but are not limited to throwing an object such as a ball, swinging an object such as a bat or golf club, pumping hand pump, opening or closing a door or window, turning steering wheel or other vehicle control, martial arts moves such as punches, sanding movements, wax on wax off, paint the house, shakes, rattles, rolls, football pitches, turning knob movements, 3D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. Comparison of the path and stored gestures may start with an assumption of a steady state if the path deviates from a steady state the path can be compared to the stored gestures by a process of elimination. If at block 1026 there is no match, the analyzers 904, 904, 906, 908 and/or mixer 910 may continue tracking the path of the controller 710 at block 1022. If there is a sufficient match between the path (or a portion thereof) and a stored gesture the state of the game may be changed as indicated at 1028. Changes of state of the game may include, but are not limited to interrupts, sending control signals, changing variables, etc.

Here is one example of this can occur. Upon determining that the controller 710 has left a steady state the path an analyzer 902, 904, 906, 908 or 914 or the gesture recognizer 1005 tracks movement of the controller 710. As long as the path of the controller 710 complies with a path defined in the stored gesture models 1008, those gestures are possible "hits". If the path of the controller 710 deviates (within the noise tolerance setting) from any gesture model 1008, that gesture model is removed from the hit list. Each gesture reference model includes a time-base in which the gesture is recorded. The analyzer 902, 904, 906, 908 or 914 compares the controller path data to the stored gestures 1008 at the appropriate time index. Occurrence of a steady state condition resets the clock. When deviating from steady state (i.e. when movements are tracked outside of the noise threshold) the hit list is populated with all potential gesture models. The clock is started and movements of the controller are compared against the hit list. Again, the comparison is a walk through time. If any gesture in the hit list reaches the end of the gesture then it is a hit.

In certain embodiments, the mixer 910 and/or individual analyzers 902, 904, 906, 908 914 may inform a game program when certain events occur. Examples of such events include the following:

INTERRUPT ZERO-ACCELERATION POINT REACHED (X AND/OR Y AN/OR Z AXIS) In certain game situations an analyzer 902, 904, 906, 908 or 914 may notify or interrupt routine within the game program when acceleration of the controller changes at the inflection points. For example, the user 708 may use the controller 710 to control a game avatar representing a quarterback in a football simulation game. The analyzers 902, 904, 906, 908, 912 may track the controller 710 (representing the football) via a path generated from signals from the inertial sensor 712, image capture unit 714, light sensors 717 and/or microphone array 718. A particular change in acceleration of the controller 710 may signal release of the football. At this point, one or more of the analyzers 902, 904, 906, 908, 914 or the gesture recognizer 1005 may trigger another routine within the program 912 (e.g., a physics simulation package) to simulate the trajectory of the football based on the position, and/or velocity and/or orientation of the controller at the point of release.
Interrupt New Gesture Recognized In addition, the analyzer 502 may be configured by one or more inputs. Examples of such inputs include, but are not limited to:

SET NOISE LEVEL (X,Y or Z AXIS) The noise level may be a reference tolerance used when analyzing jitter of the user's hands in the game.

SET SAMPLING RATE. As used herein, the sampling rate may refer to how often the analyzer 502 samples the signals from the inertial sensor. The sampling rate may be set to oversample or average the signal.

SET GEARING. As used herein gearing generally refers to the ratio of controller movements to movements occurring within the game. Examples of such "gearing" in the context of control of a video game may be found, e.g., in U.S. patent application Ser. No. 11/382,036, entitled "METHOD AND SYSTEM FOR APPLYING GEARING EFFECTS TO VISUAL TRACKING", filed on May 6, 2006; U.S. patent application Ser. No. 11/382,041, entitled "METHOD AND SYSTEM FOR APPLYING GEARING EFFECTS TO INERTIAL TRACKING", filed on May 7, 2006; U.S. patent application Ser. No. 11/382,038, entitled "METHOD AND SYSTEM FOR APPLYING GEARING EFFECTS TO ACOUSTICAL TRACKING", filed on May 6, 2006; U.S. patent application Ser. No. 11/382,040, entitled "METHOD AND SYSTEM FOR APPLYING GEARING EFFECTS TO MULTI-CHANNEL MIXED INPUT", filed on May 7, 2006, all of which are incorporated herein by reference.

SET MAPPING CHAIN. As used herein, a mapping chain refers to a map of gesture models. The gesture model maps can be made for a specific input Channel (e.g., for path data generated from inertial sensor signals only) or for a hybrid Channel formed in a mixer unit. Four input Channels may be served by two or more different Analyzers that are similar to the inertial analyzer 902, image analyzer 904, acoustic analyzer 906, light sensor analyzer 908 and mixer analyzer 914. The Analyzers 902, 904, 906, 908, 914 may be configured with a mapping chain. Mapping chains can be swapped out by the game during gameplay as can settings to the Analyzer and to the Mixer. Mapping chains are described e.g., in U.S. patent application Ser. No. 11/382,039, entitled "METHOD FOR MAPPING MOVEMENTS OF A HAND-HELD CONTROLLER TO GAME COMMANDS", filed on May 7, 2006, which is incorporated herein by reference.

Referring to again to FIG. 10A, block 1012, those of skill in the art will recognize that there are numerous ways to generate signals from the inertial sensor 712, video image capture device 714, light sensors 717 and microphone array 718. Referring to block 1014, there are numerous ways to analyze the sensor signals generated in block 1012 to obtain information relating to the position and/or orientation of the controller 710. By way of example and without limitation the tracking information may include, but is not limited to information regarding the following parameters individually or in any combination:

CONTROLLER ORIENTATION. Orientation of the controller 710 may be expressed in terms of pitch, roll or yaw angle with respect to some reference orientation, e.g., in radians). Rates of change of controller orientation (e.g., angular velocities or angular accelerations) may also be included in the position and/or orientation information. By way of example, if the inertial sensor 712 includes a gyroscopic sensor controller orientation information may be obtained directly in the form of one or more output values that are proportional to angles of pitch, roll or yaw.

CONTROLLER POSITION (e.g., Cartesian coordinates X,Y,Z of the controller 710 in some frame of reference)
CONTROLLER X-AXIS VELOCITY
CONTROLLER Y-AXIS VELOCITY
CONTROLLER Z-AXIS VELOCITY
CONTROLLER X-AXIS ACCELERATION
CONTROLLER Y-AXIS ACCELERATION
CONTROLLER Z-AXIS ACCELERATION It is noted that with respect to position, velocity and acceleration the position and/or orientation information may be expressed in terms of coordinate systems other than Cartesian. For example, cylindrical or spherical coordinates may be used for position, velocity and acceleration. Acceleration information with respect to the X, Y and Z axes may be obtained directly from an accelerometer type sensor. The X, Y and Z accelerations may be integrated with respect to time from some initial instant to determine changes in X, Y and Z velocities. These velocities may be computed by adding the velocity changes to known values of the X-, Y-, and Z-velocities at the initial instant in time. The X,Y and Z velocities may be integrated with respect to time to determine X-, Y-, and Z-displacements of the controller. The X-, Y-, and Z-positions may be determined by adding the displacements to known X-, Y-, and Z-, positions at the initial instant.

STEADY STATE Y/N—This particular information indicates whether the controller is in a steady state, which may be defined as any position, which may be subject to change too. In a preferred embodiment the steady state position may be one wherein the controller is held in a more or less level orientation at a height roughly even with a user's waist.

TIME SINCE LAST STEADY STATE generally refers to data related to how long a period of time has passed since a steady state (as referenced above) was last detected. That determination of time may, as previously noted, be calculated in real-time, processor cycles, or sampling periods. The Time Since Last Steady State data time may be important with regard to resetting tracking of a controller with regard to an initial point to ensure accuracy of character or object mapping in a game environment. This data may also be important with regard to determining available actions/gestures that might be subsequently executed in a game environment (both exclusively and inclusively).

LAST GESTURE RECOGNIZED generally refers to the last gesture recognized either by the gesture recognizer 1005 (which may be implemented in hardware or software. The identification of a last gesture recognized may be important with respect to the fact that a previous gesture may be related to the possible gestures that may be subsequently recognized or some other action that takes place in the game environment.
Time Last Gesture Recognized The above outputs can be sampled at any time by a game program or software.

In an embodiment of the present invention the mixer 910 may assign a distribution value to the tracking information 903, 905, 907, 909 from the analyzers 902, 904, 906 and 908. As noted above, certain sets of input control data may be averaged. In the present embodiment, however, the input control data is assigned a value prior to its being averaged whereby the input control data from some analyzers is of more analytical importance than from others.

For example, the mixer 910 may require tracking information related to acceleration and steady state. The mixer 910 would then receive the tracking information 903, 905, 907, 909 as described above. The tracking information may include parameters relating to acceleration and steady state, e.g., as described above. Prior to averaging the data representing this information, the mixer 910 may assign distribution values to tracking information data set 903, 905, 907, 909. For example, the x- and y-acceleration parameters from the inertial analyzer 902 may be weighted at a value of 90%. The x- and y-acceleration data from the image analyzer 906, however, may be weighted at only 10%. The acoustic analyzer tracking information 907 and light sensor information 909 as they pertain to acceleration parameters may be weighted at zero percent, that is, the data has no value.

Similarly, the Z-axis tracking information parameters from the inertial analyzer 902 may be weighted at 10% whereas the image analyzer Z-axis tracking information may be weighted at 90%. The acoustic analyzer tracking information 907 may, again, be weighted at 0% value but steady state tracking information from the acoustic analyzer 906 may be weighted at 100% with the remaining analyzer tracking information be weighted at 0%.

After the appropriate distribution weight has been assigned, the input control data may be averaged in conjunction with that weight to arrive at a weighted average input control data set that is subsequently analyzed by the gesture recognizer 1005 and associated with a particular action in the game environment. The values associated may be pre-defined by the mixer 910 or by a particular game title. The values may also be the result of the mixer 910 identifying a particular quality of data coming from the various analyzers and thus making a dynamic adjustment as is further discussed below. The adjustment may also be the result of building a historical knowledge base of when particular data is of particular value in a particular environment and/or in response to the particularities of a given game title.

The mixer 910 may be configured to operate dynamically during game play. For example, as the mixer 910 receives various input control data, it may recognize that certain data is consistently outside an acceptable range or quality of data or reflects corrupt data that may be indicative of a processing error at the related input device.

Additionally, certain conditions in a real-world environment might change. For example, natural light in the user's at-home game environment might be increasing as the morning turns to afternoon causing problems with image data capture. Further, a neighborhood or household might become noisier as the day goes on causing problems with audio data capture. Likewise, if a user has been playing for several hours, their reflexes may become less sharp thus causing problems with interpretation of inertial data.

In these instances, or in any other instance wherein the quality of a particular form of input control data is in question, the mixer 910 may dynamically reassign distribution weight to a particular set of data coming from a particular device such that more or less importance is given to particular input control data as described above. Similarly, the game environment may change over the course of the game wherein the needs of a particular game change thus requiring a reassignment of value or need for particular input control data.

Similarly, the mixer 910 may recognize that certain data being passed on to the gesture recognizer 1005 is being processed incorrectly, slowly, or not at all based on processing errors or feedback data that may be generated by the gesture recognizer 1005. In response to this feedback or in recognition of these processing difficulties (e.g., while the image analysis data is within an acceptable range, errors result when an association is made by the gesture recognizer 1005), the mixer 910 may adjust what input control data it seeks from what analyzer and when, if at all. The mixer 910 may further require certain analysis and processing of input control data by the proper analyzer before it is passed to the mixer 910, which may re-process the data (e.g., average the data) such that a further layer of assurance is made that the data passed to the gesture recognizer 1005 will be processed effectively and appropriately.

In some embodiments, the mixer 910 may recognize that certain data is corrupt, ineffective, or outside a particular variable and may call upon particular input control data or variable related to that data such that it may replace incorrect data or properly analyze and calculate certain data with respect to the necessary variables.

Figure 11:
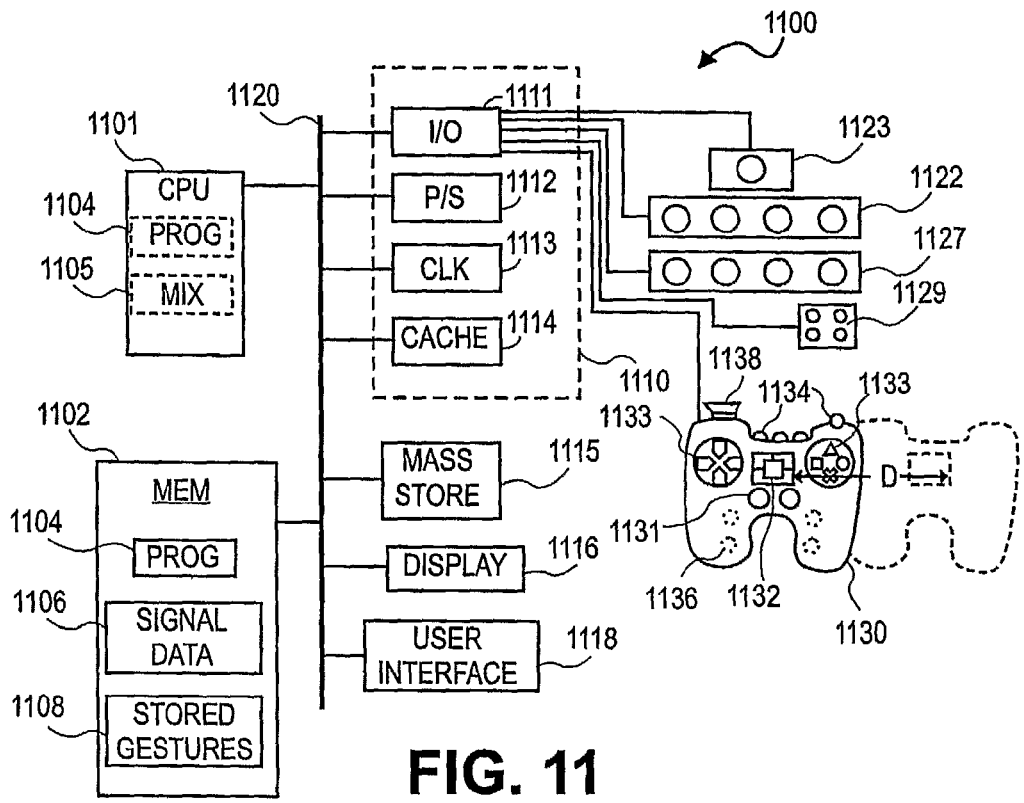
FIG. 11 is a block diagram illustrating a video game system according to an embodiment of the present invention.

By way of example, as shown in FIG. 11, a video game system 1100 may include a processor 1101 and a memory 1102 (e.g., RAM, DRAM, ROM, and the like). In addition, the video game system 1100 may have multiple processors 1101 if parallel processing is to be implemented. The memory 1102 includes data and game program code 1104, which may include portions that are configured as described in the applications incorporated by reference above.

The system 1100 may also include well-known support functions 1110, such as input/output (I/O) elements 1111, power supplies (PIS) 1112, a clock (CLK) 1113 and cache 1114. The apparatus 1100 may optionally include a mass storage device 1115 such as a disk drive, CD-ROM drive, tape drive, or the like to store programs and/or data. The controller may also optionally include a display unit 1116 and user interface unit 1118 to facilitate interaction between the apparatus 1100 and a user. The display unit 1116 may be in the form of a cathode ray tube (CRT) or flat panel screen that displays text, numerals, graphical symbols or images. The user interface 1118 may include a keyboard, mouse, joystick, light pen or other device. In addition, the user interface 1118 may include a microphone, video camera, light sensor or other signal transducing device to provide for direct capture of a signal to be analyzed. In addition, the user interface may include one or more sensors to implement bio-feedback from a user of the apparatus 1100. By way of example, any type of bio-feedback sensor may be used. Examples of such sensors include, but are not limited to, galvanic skin response sensors, electrocardiogram (EKG) sensors, electroencephalogram (EEG) sensors, perspiration sensors, strain gauges across the skin to measure muscular motion, respiration sensors, blood oxygen monitors or any other. The processor 1101, memory 1102 and other components of the system 1100 may exchange signals (e.g., code instructions and data) with each other via a system bus 1120.

A microphone array 1122 may be coupled to the system 1100 through the I/O functions 1111. The microphone array 1122 may include any number and type of microphones. By way of example the microphone array 1122 may include between about 2 and about 8 microphones, preferably about 4 microphones with neighboring microphones separated by a distance of less than about 4 centimeters, preferably between about 1 centimeter and about 2 centimeters. Preferably, the microphones in the array 1122 are omni-directional microphones. An optional image capture unit 1123 may be coupled to the apparatus 1100 through the I/O functions 1111. The image capture unit 1123 may be any suitable device for capturing one or more visual images. By way of example and without limitation the image capture unit may be a digital camera or a digital or analog video recorder. One or more pointing actuators 1125 that are mechanically coupled to the camera may exchange signals with the processor 1101 via the I/O functions 1111. In addition, one or more light sensors 11211, e.g., a quad sensor or linear, two-dimensional or three-dimensional array of quad sensors may be coupled to the processor 1102 via the I/O functions 1111.

As used herein, the term I/O generally refers to any program, operation or device that transfers data to or from the system 1100 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 1100 may include one or more controllers 1130 coupled to the processor via the I/O functions 1111 either through wires (e.g., a USB cable) or wirelessly. Each controller 1130 may have analog joystick controls 1131 and conventional buttons 1133 that provide control signals commonly used during playing of video games. Such video games may be implemented as processor readable data and/or instructions from the program 1104 which may be stored in the memory 1102 or other processor readable medium such as one associated with the mass storage device 1115. In some embodiments, the mixer 1105 may receive inputs from the analog joystick controls 1131 and the buttons 1133.

The joystick controls 1131 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

Each game controller 1130 may include a communications interface operable to conduct digital communications with at least one of the processor 1102, a game controller 1130 or both. The communications interface may include a universal asynchronous receiver transmitter ("UART"). The UART may be operable to receive a control signal for controlling an operation of a tracking device, or for transmitting a signal from the tracking device for communication with another device. Alternatively, the communications interface includes a universal serial bus ("USB") controller. The USB controller may be operable to receive a control signal for controlling an operation of the tracking device, or for transmitting a signal from the tracking device for communication with another device.

In addition, each controller 1130 may include one or more inertial sensors 1132, which may provide position and/or orientation information to the processor 1101 via an inertial signal. Orientation information may include angular information such as a tilt, roll or yaw of the controller 1130. By way of example, the inertial sensors 1132 may include any number and/or combination of accelerometers, gyroscopes or tilt sensors or other inertial sensors. In a preferred embodiment, the inertial sensors 1132 may include tilt sensors adapted to sense orientation of the game controller 1132 with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device. By way of example an accelerometer may include a mass mounted by one or more springs with sensors for sensing displacement of the mass relative to one or more directions. Signals from the sensors that are dependent on the displacement of the mass may be used to determine an acceleration of the game controller 1130. Such techniques may be implemented by instructions from the game program 1104 which may be stored in the memory 1102 and executed by the processor 1101.

The inertial sensor 1132 may be any sensor suitable for sensing position and/or velocity and/or acceleration and/or orientation. By way of example the inertial sensor 1132 may include an accelerometer and/or gyroscope and/or tilt sensor and/or other suitable sensors. An example of an accelerometer may be a simple mass elastically coupled at three or four points to a frame, e.g., by springs. Pitch and roll axes may lie in a plane that intersects the frame, which is mounted to the game controller 1130. As the frame (and the game controller 1130) rotates about pitch and roll axes the mass will displace under the influence of gravity and the springs may elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device may be used to determine tilt, roll angular acceleration about the yaw axis and linear acceleration along the pitch and/or roll and/or yaw axes by tracking movement of the mass or compression and expansion forces of the springs. Any suitable technique may be used to track the position of the mass and/or or the forces exerted on it. Examples of suitable techniques include, but are not limited to the use of resistive strain gauge material, photonic sensors, magnetic sensors, hall-effect devices, piezoelectric devices, capacitive sensors, and/or any other suitable position and/or force tracking mechanism. In some embodiments, the inertial sensor 1132 may be removably mounted to a "body" of the joystick controller 1130.

In addition, each game controller 1130 may include one or more light sources 1134, such as light emitting diodes (LEDs). In some embodiments, the light sources 1134 may be removably mounted to a "body" of the joystick controller 1130. The lights sources 1134 may emit light in any suitable wavelength range. Suitable wavelength ranges include, but are not limited to the visible and the infrared wavelength ranges. The light sources 1134 may be used to distinguish one controller from the other. For example one or more LEDs can accomplish this by flashing or holding an LED pattern code. By way of example, 5 LEDs can be provided on the game controller 1130 in a linear or two-dimensional pattern. Although a linear array of LEDs is preferred, the LEDs may alternatively, be arranged in a rectangular pattern or an arcuate pattern or any other pattern to facilitate determination of an image plane of the LED array when analyzing an image of the LED pattern obtained by the image capture unit 1123 and/or light sensor(s) 1127. In addition, the controller 1130 may include one or more light sensors 1136 that sense light from remotely located light sources 1129. The remotely located light sources 1129 may be coupled to the processor 1102 through the I/O functions 1111. The light sources 1129 may be pulsed or strobed with respect to time and/or wavelength in response to instructions from the program 1104.

Furthermore, the LED pattern codes may also be used to determine the positioning of the game controller 1130 during game play. For instance, the LEDs can assist in identifying tilt, yaw and roll of the controllers. This detection pattern can assist in providing a better user/feel in games, such as aircraft flying games, or any other game. The image capture unit 1123 may capture images containing the game controller 1130 and light sources 1134. Analysis of such images can determine the location and/or orientation of the game controller. Such analysis may be implemented by program code instructions 1104 stored in the memory 1102 and executed by the processor 1101. To facilitate capture of images of the light sources 1134 by the image capture unit 1123 and/or light sensor(s) 1127 the light sources 1134 may be placed on two or more different sides of the game controller 1130, e.g., on the front and on the back (as shown in phantom). Such placement allows the image capture unit 1123 to obtain images of the light sources 1134 for different orientations of the game controller 1130 depending on how the game controller 1130 is held by a user.

In addition the light sources 1134 may provide telemetry signals to the processor 1101, e.g., in pulse code, amplitude modulation or frequency modulation format, phase modulation format or any other modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 1101 may decode the telemetry signal from the optical signal and execute a game command in response to the decoded telemetry signal. Telemetry signals may be decoded from analysis of images of the game controller 1130 obtained by the image capture unit 1123 or measurements of light intensity from the lights sources 1134 as described above. Alternatively, the apparatus 1100 may include a separate optical sensor dedicated to receiving telemetry signals from the lights sources 1134. The use of LEDs in conjunction with determining an intensity amount in interfacing with a computer program is described, e.g., in U.S. patent application Ser. No. 11/429414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", filed May 4, 2006, which is incorporated herein by reference in its entirety. In addition, analysis of images containing the light sources 1134 may be used for both telemetry and determining the position and/or orientation of the game controller 1130. Such techniques may be implemented by instructions of the program 1104 which may be stored in the memory 1102 and executed by the processor 1101.

The processor 1101 may use the inertial signals from the inertial sensor 1132 in conjunction with optical signals from light sources 1134 detected by the image capture unit 1123 and/or light sensor(s) 1127 and/or in conjunction with sound source location and characterization information from acoustic signals detected by the microphone array 1122 to deduce information on the location and/or orientation of a controller 1130 and/or its user. For example, "acoustic radar" sound source location and characterization may be used in conjunction with the microphone array 1122 to track a moving voice while motion of the game controller is independently tracked (through the inertial sensor 1132 and or light sources 1134). In acoustic radar select a pre-calibrated listening zone may be selected at runtime and sounds originating from sources outside the pre-calibrated listening zone are filtered out. The pre-calibrated listening zones may include a listening zone that corresponds to a volume of focus or field of view of the image capture unit 1123. Examples of acoustic radar are described in detail in U.S. patent application Ser. No. 11/381, 724, to Xiadong Mao entitled "METHODS AND APPARATUS FOR TARGETED SOUND DETECTION AND CHARACTERIZATION", filed May 4, 2006, which is incorporated herein by reference. Any number of different combinations of different modes of providing control signals to the processor 1101 may be used in conjunction with embodiments of the present invention. Such techniques may be implemented by program code instructions 1104 which may be stored in the memory 1102 and executed by the processor 1101 and may optionally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 1123.

The program 1104 may optionally include one or more instructions that direct the one or more processors to produce a discrete time domain input signal $x_m(t)$ from microphones $M_0 \ldots M_M$, of the microphone array 1122, determine a listening sector, and use the listening sector in a semi-blind source separation to select the finite impulse response filter coefficients to separate out different sound sources from input signal $x_m(t)$. The program 1104 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal $y(t)$ from the microphone array. The fractional delays may be selected to such that a signal from the reference microphone $M_0$ is first in time relative to signals from the other microphone(s) of the array. The program 1104 may also include instructions to introduce a fractional time delay Δ into an output signal $y(t)$ of the microphone array so that: $y(t+\Delta) = x(t+\Delta)*b_0 + x(t-1+\Delta)*b_1 + x(t-2+\Delta)*b_2 + \ldots + x(t-N+\Delta)b_N$, where Δ is between zero and ±1. Examples of such techniques are described in detail in U.S. patent application Ser. No. 11/381,729, to Xiadong Mao, entitled "ULTRA SMALL MICROPHONE ARRAY" filed May 4, 2006, the entire disclosures of which are incorporated by reference. As noted above, by modulating the light from the light sources 1134 the same technique may be applied to determination of a source direction to the controller 1130 by similarly analyzing signals from the light sensor(s) 1127.

The program 1104 may include one or more instructions which, when executed, cause the system 1100 to select a pre-calibrated listening zone that contains a source of sound. Such instructions may cause the apparatus to determine whether a source of sound lies within an initial sector or on a particular side of the initial zone. If the source of sound does not lie within the default sector, the instructions may, when executed, select a different sector on the particular side of the default sector. The different zone may be characterized by an attenuation of the input signals that is closest to an optimum value. These instructions may, when executed, calculate an attenuation of input signals from the microphone array 1122 and the attenuation to an optimum value. The instructions may, when executed, cause the apparatus 1100 to determine a value of an attenuation of the input signals for one or more sectors and select a zone for which the attenuation is closest to an optimum value. Examples of such a technique are described, e.g., in U.S. patent application Ser. No. 11/381, 725, to Xiadong Mao, entitled "METHODS AND APPARATUS FOR TARGETED SOUND DETECTION" filed May 4, 2006, the disclosures of which are incorporated herein by reference. Again, a similar technique may be applied to location of a pre-calibrated directional zone using the light sources 1134 and light sensors 1127.

Signals from the inertial sensor 1132 may provide part of a tracking information input and signals generated from the image capture unit 1123 and/or light sensors 1127 tracking the one or more light sources 1134 may provide another part of the tracking information input. By way of example, and without limitation, such "mixed mode" signals may be used in a football type video game in which a Quarterback pitches the ball to the right after a head fake head movement to the left. Specifically, a game player holding the controller 1130 may turn his head to the left and make a sound while making a pitch movement swinging the controller out to the right like it was the football. The microphone array 1122 in conjunction with "acoustic radar" program code can track the user's voice. The image capture unit 1123 and/or light sensor(s) 1127 may track the motion of the user's head or track other commands that do not require sound or use of the controller. The inertial sensor 1132 may track the motion of the game controller 1130 (representing the football). The image capture unit 1123 and/or light sensor(s) 1127 may also track the light sources 1134 on the controller 1130. Alternatively, the light sensors 1136 on the controller 1130 may track the remotely located light sources 1129. The user may release of the "ball" upon reaching a certain amount and/or direction of acceleration of the game controller 1130 or upon a key command triggered by pressing a button on the controller 1130.

In certain embodiments of the present invention, an inertial signal from the inertial sensor 1132 may be used to determine a location of the controller 1130. By way of example, the inertial sensor may include an accelerometer capable of sensing acceleration in one or more directions. An acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Position determination using the inertial sensor 1132 may be made more quickly than using the image capture unit 1123 and/or light sensor(s) 1127 and light sources 1134 and/or the light sources 1129 and light sensors 1136. However, certain types of inertial sensor may be subject to a type of error known as "drift" in which errors that accumulate over time can lead to a discrepancy D between the position of the joystick 1130 calculated from the inertial signal (shown in phantom) and the actual position of the game controller 1130. Embodiments of the present invention allow a number of ways to deal with such errors.

For example, the drift may be cancelled out manually by re-setting the initial position of the controller 1130 to be equal to the current calculated position. A user may use one or more of the buttons on the controller 1130 to trigger a command to re-set the initial position. Alternatively, image-based drift may be implemented by re-setting the current position to a position determined from an image obtained from the image capture unit 1123 as a reference. Such image-based drift compensation may be implemented manually, e.g., when the user triggers one or more of the buttons on the game controller 1130. Alternatively, image-based drift compensation may be implemented automatically, e.g., at regular intervals of time or in response to game play. Such techniques may be implemented by program code instructions 1104 which may be stored in the memory 1102 and executed by the processor 1101.

In certain embodiments it may be desirable to compensate for spurious data in the inertial sensor signal. For example the signal from the inertial sensor 1132 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by instructions of the program 1104 which may be stored in the memory 1102 and executed by the processor 1101.

In embodiments of the invention, the memory 1102 may include tracking signal data 1106 which may include stored controller path information, which may be generated from the inertial sensor 1132, image capture unit 1123, microphone array 1122, light sensor(s) 1127 and/or 1136 and/or user interface 1118 as described above. The tracking signal data may be used to track the motion of one or more controller 1130 using one or more control loops. The memory 1102 may also contain stored gesture data 1108, e.g., data representing one or more gestures relevant to the game program 1104. In addition the gesture data 1108 may include data relating to the mapping of gestures that are recognized for a controller usable with one system to a controller usable with a different system. Coded instructions executed on the processor 1102 may implement a multi-input mixer 1105, which may be configured and function as described in U.S. patent application Ser. Nos. 11/382,031, 11/382,032 and 11/382,250. The processor 1101 may perform analysis of tracking signal data 1106 as described above in response to the data 1106 and program code instructions of a program 1104 stored and retrieved by the memory 1102 and executed by the processor module 1101. Code portions of the program 1104 may conform to any one of a number of different programming languages such as Assembly, C++, JAVA or a number of other languages. The processor module 1101 forms a general-purpose computer that becomes a specific purpose computer when executing programs such as the program code 1104. Although the program code 1104 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 1104 may include a set of processor readable instructions that that direct the one or more processors to analyze signals from the inertial sensor 1132 to generate position and/or orientation information and utilize the information during play of a video game. The program code 1104 may optionally include processor executable instructions including one or more instructions which, when executed cause the image capture unit 1123 and/or light sensor(s) 1127 to monitor a field of view in front of the image capture unit 1123, identify one or more of the light sources 1134 within the field of view, detect a change in light emitted from the light source(s) 1134; and in response to detecting the change, triggering an input command to the processor 1101. It is noted that similar instructions may be used to track the lights sources 1129 with the light sensors 1136 on the controller 1130. The use of LEDs in conjunction with an image capture device to trigger actions in a game controller is described e.g., in U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 1104 may optionally include processor executable instructions including one or more instructions which, when executed, use signals from the inertial sensor 1132 and/or signals generated from the image capture unit 1123 and/or light sensor(s) 1127 and/or 1136 from tracking the one or more light sources and/or signals generated from the microphone array 1122 as inputs to a game system, e.g., as described above. The program code 1104 may optionally include processor executable instructions including one or more instructions which, when executed compensate for drift in the inertial sensor 1132.

In addition, the program code 1104 may optionally include processor executable instructions including one or more instructions which, when executed adjust the gearing and mapping of controller manipulations to game a environment. Such a feature allows a user to change the "gearing" of manipulations of the game controller 1130 to game state. For example, a 45 degree rotation of the game controller 1130 may be geared to a 45 degree rotation of a game object. However this 1:1 gearing ratio may be modified so that an X degree rotation (or tilt or yaw or "manipulation") of the controller translates to a Y rotation (or tilt or yaw or "manipulation") of the game object. Gearing may be 1:1 ratio, 1:2 ratio, 1:X ratio or X:Y ratio, where X and Y can take on arbitrary values. Additionally, mapping of input channel to game control may also be modified over time or instantly. Modifications may comprise changing gesture trajectory models, modifying the location, scale, threshold of gestures, etc. Such mapping may be programmed, random, tiered, staggered, etc., to provide a user with a dynamic range of manipulatives. Modification of the mapping, gearing or ratios can be adjusted by the game program 1104 according to game play, game state, through a user modifier button (key pad, etc.) located on the game controller 1130, or broadly in response to the input channel. The input channel may include, but may not be limited to elements of user audio, audio generated by controller, tracking audio generated by the controller, controller button state, video camera output, controller telemetry data, including accelerometer data, tilt, yaw, roll, position, acceleration and any other data from sensors capable of tracking a user or the user manipulation of an object.

In certain embodiments the game program 1104 may change the mapping or gearing over time from one scheme or ratio to another scheme, respectively, in a predetermined time-dependent manner. Gearing and mapping changes can be applied to a game environment in various ways. In one example, a video game character may be controlled under one gearing scheme when the character is healthy and as the character's health deteriorates the system may gear the controller commands so the user is forced to exacerbate the movements of the controller to gesture commands to the character. A video game character who becomes disoriented may force a change of mapping of the input channel as users, for example, may be required to adjust input to regain control of the character under a new mapping. Mapping schemes that modify the translation of the input channel to game commands may also change during gameplay. This translation may occur in various ways in response to game state or in response to modifier commands issued under one or more elements of the input channel. Gearing and mapping may also be configured to influence the configuration and/or processing of one or more elements of the input channel.

In addition, a sound emitter 1138, e.g., a speaker, a buzzer, a horn or a pipe, may be mounted to the joystick controller 1130. In certain embodiments the sound emitter may be detachably mounted to a "body" of the joystick controller 1130. In "acoustic radar" embodiments wherein the program code 1104 locates and characterizes sounds detected with the microphone array 1122, the sound emitter 1138 may provide an audio signal that can be detected by the microphone array 1122 and used by the program code 1104 to track the position of the game controller 1130. The sound emitter 1138 may also be used to provide an additional "input channel" from the game controller 1130 to the processor 1101. Audio signals from the sound emitter 1138 may be periodically pulsed to provide a beacon for the acoustic radar to track location. The audio signals (pulsed or otherwise) may be audible or ultrasonic. The acoustic radar may track the user manipulation of the game controller 1130 and where such manipulation tracking may include information about the position and orientation (e.g., pitch, roll or yaw angle) of the game controller 1130. The pulses may be triggered at an appropriate duty cycle as one skilled in the art is capable of applying. Pulses may be initiated based on a control signal arbitrated from the system. The system 1100 (through the program code 1104) may coordinate the dispatch of control signals amongst two or more joystick controllers 1130 coupled to the processor 1101 to assure that multiple controllers can be tracked.

In certain embodiments, the mixer 1105 may be configured to obtain input for controlling execution of the game program 1104 using inputs received from conventional controls on the game controller 1130, e.g., analog joystick controls 1131 and buttons 1133. Specifically receiving the mixer 1105 may receive controller input information from the controller 1130. The controller input information may include at least one of a) information for identifying a current position of a user-movable control stick of the game controller in relation to a rest position of the control stick, or b) information identifying whether a switch included in the game controller is active. The mixer 1105 may further receive supplementary input information from an environment in which the controller 1130 is being used. By way of example and without limitation, the supplementary input information may include one or more of i) information obtained from an image capture device in the environment (e.g., image capture unit 1123 and/or light sensor(s) 1127 and/or 1136); and/or ii) information from an inertial sensor associated with at least one of the game controller or a use (e.g., inertial sensor 632); and/or iii) acoustic information obtained from an acoustic transducer in the environment (e.g., from the microphone array 1122, possibly in conjunction with an acoustic signal generated by the sound emitter 1138).

The controller input information may also include information identifying whether a pressure-sensitive button is active. The mixer 1105 may obtain a combined input for controlling the execution of the game program 1104 by processing the controller input information and the supplementary input information to yield the combined input.

The combined input may include individual merged inputs for controlling respective individual functions during execution of the game program 1104. At least some of the individual merged inputs may be obtained by merging the controller input information relative to a particular individual function and the supplementary input information relative to the particular individual function. The combined input may include merged input for controlling a function during execution of the game program 1104, and at least some of the merged input may be obtained by merging the controller input information relative to the function and the supplementary input information relative to the function. In such cases the merging may be performed by averaging a value representative of the controller input information with a value representative of the supplementary input information. By way of example, the value of the controller input information may be averaged in a one-to-one ratio with the value of the supplementary input information. Alternatively, the controller input information and the supplementary input information may each be each assigned different weights and averaging may be performed as a weighted average of the values of controller input information and supplementary input information in accordance with the assigned weights.

In some embodiments, a value of a first one of the controller input information or the supplementary input information may be utilized as modifying input to the game program for modifying control over a still active function activated in accordance with at least one of a second one of the controller input information or the supplementary input information. The supplementary input information may include inertial sensor information obtained by operation of the inertial sensor 1132 and/or orientation information representative of an orientation of a user-movable object. Alternatively, the supplementary input information includes information indicative of at least one of a position or an orientation of a user-movable object. As used here, the user-movable object may refer to the controller 1132 or an article mounted to a body of the controller 1132 and the supplementary input information includes information indicative of an orientation of the user-movable object. By way of example such orientation information may include information indicative of at least one of pitch, yaw or roll.

In some embodiments, the combined input may be obtained by merging a value of controller input information representative of a position of a control stick (e.g., one of the analog joysticks 1131, with a value of the supplementary input information representative of the orientation of the user-movable object. As state above, the user-movable object may include an object mounted to the game controller 1130 and/or the game controller 1130, and the combined input may reflect an enhanced pitch up input when the control stick is moved backward while the pitch is increased to a positive (nose-up) value. Similarly, the combined input may reflect an enhanced pitch down input when the control stick is moved forward while the pitch is decreased to a negative (nose-down) value.

The combined input may be obtained by assigning the value of the controller input information representative of a position of the control stick as coarse control information and assigning the value of the supplementary input information representative of the orientation of the user-movable object as fine control information. Alternatively, the combined input may be obtained by assigning the value of the controller input information identifying whether a switch of the game controller is active as coarse control information and assigning the value of the supplementary input information representative of the orientation of the user-movable object as fine control information. In addition, the combined input may be obtained by assigning the value of the supplementary input information representative of the orientation of the user-movable object as coarse control information and assigning the value of the controller input information representative of a position of the control stick as fine control information. Furthermore, the combined input may also be obtained by assigning the value of the controller input information identifying whether a switch of the game controller is active as fine control information and assigning the value of the supplementary input information representative of the orientation of the user-movable object as coarse control information. In any or all of these cases, the combined input may be representative of the value of the coarse control information as adjusted a relatively small amount in accordance with the fine control information.

In some embodiments, the combined input may be obtained by additively combining a value represented by the controller input information with a value represented by the supplementary input information such that the combined input presents a signal having a higher or lower value to the game program 1104 than either of the values of the controller input information or the supplementary input information taken alone. The combined input may alternatively present a signal having a smoothed value to the game program 1104, the smoothed value signal being subject to change more slowly with time than either of the values of the controller input information or the supplementary input information taken alone. The combined input may also present a high definition signal having increased signal content to the game program. The high definition signal may be subject to change more rapidly with time than either of the values of the controller input information or the supplementary input information taken alone.

Although embodiments of the present invention are described in terms of examples related to a video game controller 1130 games, embodiments of the invention, including the system 1100 may be used on any user manipulated body, molded object, knob, structure, etc, with inertial sensing capability and inertial sensor signal transmission capability, wireless or otherwise.

Figure 12:
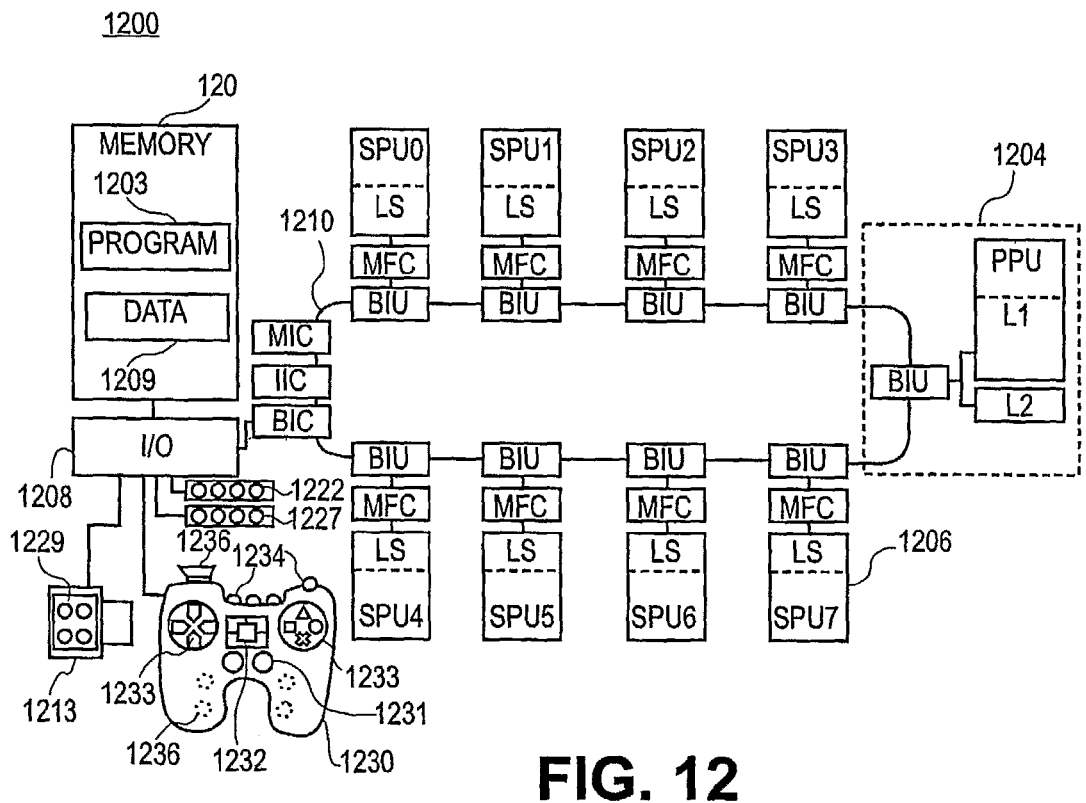
FIG. 12 is a block diagram of a cell processor implementation of the video game system according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 12 illustrates a type of cell processor 1200 according to an embodiment of the present invention. The cell processor 1200 may be used as the processor 1101 of FIG. 11 and/or the processor unit 612 of FIGS. 6A-6B and/or the processor unit 220 of FIG. 2 and/or the processor 1002 of FIG. 10A. In the example depicted in FIG. 12, the cell processor 1200 includes a main memory 1202, power processor element (PPE) 1204, and a number of synergistic processor elements (SPEs) 1206. In the example depicted in FIG. 12, the cell processor 1200 may include a single PPE 1204 and eight SPE 1206. In such a configuration, seven of the SPE 1206 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 12.

The main memory 1202 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a video game program 1203 may be resident in main memory 1202. The video program 1203 may include inertial, image and acoustic analyzers and a mixer configured as described in U.S. patent application Ser. Nos. 11/382,031, 11/382,032 and 11/382,250 or some combination of these. The program 1203 may run on the PPE. The program 1203 may be divided up into multiple signal processing tasks that can be executed on the SPEs and/or PPE.

By way of example, the PPE 1204 may be a 64-bit PowerPC Processor Unit (PPU) with associated caches L1 and L2. The PPE 1204 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 1204 is the management and allocation of tasks for the SPEs 1206 in the cell processor 1200.

Although only a single PPE is shown in FIG. 12, some cell processor implementations, such as cell broadband engine architecture (CBEA), the cell processor 1200 may have multiple PPEs organized into PPE groups, of which there may be more than one. These PPE groups may share access to the main memory 1202. Furthermore the cell processor 1200 may include two or more groups SPEs. The SPE groups may also share access to the main memory 1202. Such configurations are within the scope of the present invention.

Each SPE 1206 may include a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in the system 1200 may be performed by issuing direct memory access (DMA) commands from the memory flow controller (MFC) to transfer data to or from the local storage domain (of the individual SPE). The SPUs are less complex computational units than the PPE 1204 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 1204 allow for cost-effective processing over a wide range of applications.

Each SPE 1206 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 1206 and/or between the SPEs 1206 and the PPE 1204, the SPEs 1206 and PPE 1204 may include signal notification registers that are tied to signaling events. The PPE 1204 and SPEs 1206 may be coupled by a star topology in which the PPE 1204 acts as a router to transmit messages to the SPEs 1206. Alternatively, each SPE 1206 and the PPE 1204 may have a one-way signal notification register referred to as a mailbox. The mailbox can be used by an SPE 1206 to host operating system (OS) synchronization.

The cell processor 1200 may include an input/output (I/O) function 1208 through which the cell processor 1200 may interface with peripheral devices, such as a microphone array 1212 and optional image capture unit 1213, light sensors 1227, light sources 1229 and a game controller 1230. The game controller unit 1230 may include joystick controllers 1231, an inertial sensor 1232, buttons 1233 light sources 1234 and/or lights sensors 1236 and/or a sound source 1238. In addition an Element Interconnect Bus 1210 may connect the various components such as a microphone array 1222, and/or light sensors 1227 and/or light sources 1229 and/or game controller 1230 as described above. Each SPE and the PPE may access the bus 1210 through a bus interface units BIU. The cell processor 1200 may also includes two controllers typically found in a processor: a Memory Interface Controller MIC that controls the flow of data between the bus 1210 and the main memory 1202, and a Bus Interface Controller BIC, which controls the flow of data between the I/O 1208 and the bus 1210. Although the requirements for the MIC, BIC, BIUs and bus 1210 may vary widely for different implementations, those of skill in the art will be familiar their functions and circuits for implementing them.

The cell processor 1200 may also include an internal interrupt controller IIC. The IIC component manages the priority of the interrupts presented to the PPE. The TIC allows interrupts from the other components the cell processor 1200 to be handled without using a main system interrupt controller. The IIC may be regarded as a second level controller. The main system interrupt controller may handle interrupts originating external to the cell processor.

In embodiments of the present invention, certain computations, such as the fractional delays described above, may be performed in parallel using the PPE 1204 and/or one or more of the SPE 1206. Each fractional delay calculation may be run as one or more separate tasks that different SPE 1206 may take as they become available.

The embodiments discussed above, provides users with an intuitive pointing capability capable of operating in free space without a flat surface. The sender portion does not require expensive or complicated electronics, and thus can be provided to users for a nominal cost. Furthermore, light sources suitable for implementing embodiments of the invention, such as LEDs, typically consume very little power. The sender and receiver portions do not depend on a signal from the display device to determine the position of a target point, and thus can operate with any type of display technology, including LCD, CRT, plasma, and DLP, LCOS, and other types of projection displays. The receiver portion can be integrated into a wide-variety of different types of devices. Furthermore, the processing requirements for the receiver portion are very low, enabling these functions to be implementing using relatively simple microprocessors or microcontrollers, which can be dedicated solely to these functions or implement additional functions of the device.

Further embodiments can be envisioned to one of ordinary skill in the art after reading the attached documents. For example, the gradient pattern and speckle or concentric circle patterns can be combined to provide an absolute positioning means and redundant means of determining relative motion. This embodiment can provide users with coarse absolute positioning of the pointer and very fine control of the relative motion of the pointer. In additional embodiments the sender portion can be integrated with other types of controls, such as remote controls, wired or wireless game pad or joysticks, cell phones, personal digital assistants (PDA) and handheld computers, laser pointers, or any other type of electronic device capable of being carried by a person. Additionally, the receiver portion can be integrated into the display device, a device providing a display signal to a display device, or a device providing an interface control signal to a control interface of a display device or any device providing display signal to a display device. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for providing a positional input value to an electronic device, the system comprising:
   a sender portion adapted to be manipulated by a user to specify a target point within a target area, the sender portion including a light projecting system adapted to project a pattern of light including a predefined spatially varying characteristic at the target area; and
   a receiver portion including at least one sensor unit, the sensor unit is adapted to measure at least one value of the spatially varying characteristic of the pattern of light at the location of the sensor unit, wherein the receiver portion includes logic adapted to determine a positional input value associated with the target point from the value of the spatially varying characteristic at the location of the sensor unit,
   wherein the predefined spatially varying characteristic of the pattern of light is an intensity pattern, and wherein the sensor unit is part of a plurality of sensor units, each sensor unit at a different location and adapted to measure the value of the spatially varying characteristic of the pattern of light at its respective location, wherein the value of the spatially varying characteristic is an intensity of light received from the sender portion, and wherein the receiver portion includes logic adapted to determine the positional input value associated with the target point from intensity of the pattern of light measured by the plurality of sensor unit locations.

2. The system of claim 1, wherein the light projecting system is adapted to disperse the pattern of light such that at least a portion of the pattern of light is received by at least one sensor unit of the receiver portion regardless of the location of the target point within the target area.

3. The system of claim 1, wherein the receiver portion includes logic adapted to determine a plurality of distance values corresponding with at least a portion of one or more intensity values measured by the plurality of sensor units, each distance value representing the distance between the location of its respective sensor unit and the target point.

4. The system of claim 3, wherein the receiver portion includes logic adapted to determine the position of the target point from the plurality of distance values.

5. The system of claim 4, wherein the positional input value is the position of the target point.

6. The system of claim 4, wherein the receiver portion includes logic adapted to compare the position of the target point with a previously determined position of the target point to determine a positional input value representing the relative motion of the target point.

7. The system of claim 1, wherein the predefined spatially varying characteristic of the pattern of light is a pattern including a plurality of intensity transitions adapted to indicate motion of the target point.

8. The system of claim 7, wherein the pattern includes a plurality of concentric circles.

9. The system of claim 7, wherein the pattern includes a plurality of speckles.

10. The system of claim 7, wherein the value of the spatially varying characteristic of the beam of light at the location of the sensor unit includes the presence of an intensity transition at the location of the sensor unit.

11. The system of claim 10, wherein the value of the spatially varying characteristic of the beam of light includes a direction of pattern motion.

12. The system of claim 11, wherein the sensor unit includes a plurality of sensors arranged to detect a direction of pattern motion along at least one axis.

13. The system of claim 12, wherein the receiver portion includes logic adapted to compare changes in intensity received by each sensor over time to determine a direction of pattern motion.

14. The system of claim 10, wherein the positional input value is a relative motion of the target point and the receiver portion includes logic to determine a magnitude of the relative motion of the target point by detecting a change in the presence of an intensity transition at the location of the sensor unit.

15. The system of claim 13, wherein the positional input value is a relative motion of the target point and the receiver portion includes logic to determine a direction of the relative motion of the target point from the direction of pattern motion.

16. The system of claim 1, wherein the positional input value is used to manipulate a pointer in a graphical user interface.

17. The system of claim 1, wherein the pattern of light is in the infrared spectrum.

18. The system of claim 1, wherein light projecting system is adapted to modulate the beam of light to reduce interference from other light sources, and wherein the receiver portion is adapted to demodulate the beam of light received by the sensor unit.

19. The system of claim 1, wherein the sender portion includes a switch to activate the light projecting system.

20. The system of claim 1, wherein the receiver portion is integrated with a display device, the display device adapted to provide visual feedback to the user in response to receiving the pattern of light from the sender portion.

21. The system of claim 1, wherein the logic is adapted to determine the positional input value in the form of a position and/or orientation of the sender portion.

22. The system of claim 1, wherein the sensor is attached to a user-moveable object.

23. The system of claim 22 wherein the sender portion is removably attached to the user-movable object.

24. The system of claim 22 wherein the user-movable object includes at least one of the game controller or an article mounted to a body of the game controller.

25. The system of claim 22, further comprising one or more of a sound source, a light source and an inertial sensor attached to the body of the user-movable object.

26. The system of claim 25 wherein the sender and/or sound source and/or light source and/or inertial sensor is removably attached to the user-movable object.

27. A system for determining a positional input value associated with a target point specified by a user, the system comprising:
   at least one sensor unit, wherein the sensor unit is adapted to measure at least one value of a spatially varying characteristic of a pattern of light projected towards the sensor unit;
   a processing unit connected with the at least one sensor unit and including logic adapted to determine a positional input value associated with a target point specified by a user from the value of the spatially varying characteristic from the at least one sensor unit,
   wherein the predefined spatially varying characteristic of the pattern of light is an intensity pattern, and wherein the sensor unit is part of a plurality of sensor units, each sensor unit at a different location and adapted to measure the value of the spatially varying characteristic of the pattern of light at its respective location, wherein the value of the spatially varying characteristic is an intensity of light received from the sender portion, and wherein the processing unit includes logic adapted to determine the positional input value associated with the target point from intensity of the pattern of light measured by the plurality of sensor unit locations.

28. The system of claim 27, wherein the processing unit includes logic adapted to determine a plurality of distance values corresponding with at least a portion of the intensity values measured by the plurality of sensor units, each distance value representing the distance between the location of its respective sensor unit and the target point, and logic adapted to determine the position of the target point from the plurality of distance values.

* * * * *